(12) United States Patent
Strobel et al.

(10) Patent No.: US 12,501,003 B2
(45) Date of Patent: Dec. 16, 2025

(54) MULTI-SENSOR ASSEMBLY WITH IMPROVED BACKWARD VIEW OF A VEHICLE

(71) Applicant: Waymo LLC, Mountain View, CA (US)

(72) Inventors: Andre Manfred Strobel, Mountain View, CA (US); Mark Stephen Calleija, Mountain View, CA (US); Aman Ved Kalia, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 181 days.

(21) Appl. No.: 17/933,767

(22) Filed: Sep. 20, 2022

(65) Prior Publication Data
US 2024/0106987 A1  Mar. 28, 2024

(51) Int. Cl.
*H04N 23/90* (2023.01)
*B60R 11/00* (2006.01)
(Continued)

(52) U.S. Cl.
CPC ........... *H04N 7/181* (2013.01); *G01S 13/931* (2013.01); *H04N 23/51* (2023.01); *H04N 23/90* (2023.01);
(Continued)

(58) Field of Classification Search
CPC ........ H04N 7/181; H04N 23/51; H04N 23/80; H04N 23/90; H04N 7/18; G01S 13/931;
(Continued)

(56) References Cited

U.S. PATENT DOCUMENTS 3,689,695 A * 9/1972 Rosenfield ............. F16M 11/28
                                                              348/148
6,690,413 B1 2/2004 Moore
(Continued)

OTHER PUBLICATIONS

Paul S. Rau, et al., Enhanced Camera/Video Imaging Systems (E-C/VISs) for Heavy Vehicles, International Technical Conference on the Enhanced Safety of Vehicles (ESV), Paper No. 09-0570 W, Jun. 2019.

*Primary Examiner* — John W Miller
*Assistant Examiner* — Humam M Satti
(74) *Attorney, Agent, or Firm* — McDonnell Boehnen Hulbert & Berghoff LLP

(57) ABSTRACT

A sensor assembly contains at least first and second sensors configured to perform imaging from a portion of a vehicle, each sensor having a respective field of view (FOV) based on an imaging direction of the sensor, each sensor having an FOV origin. The sensor assembly is configured to be disposed at the portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction to being parallel to the backward direction of the vehicle, and (iv) the first sensor's FOV origin is more outboard from the vehicle than the second sensor's FOV origin.

20 Claims, 19 Drawing Sheets

(51) Int. Cl.
| | |
|---|---|
| *B60R 11/02* | (2006.01) |
| *B60R 11/04* | (2006.01) |
| *G01S 13/931* | (2020.01) |
| *H04N 7/18* | (2006.01) |
| *H04N 23/51* | (2023.01) |
| *B60W 60/00* | (2020.01) |
| *G01S 13/86* | (2006.01) |

(52) U.S. Cl.
CPC ..... *B60R 2011/004* (2013.01); *B60R 11/0247* (2013.01); *B60R 11/04* (2013.01); *B60W 60/001* (2020.02); *B60W 2420/403* (2013.01); *B60W 2420/408* (2024.01); *B60W 2420/54* (2013.01); *G01S 13/862* (2013.01); *G01S 13/865* (2013.01); *G01S 13/867* (2013.01); *G01S 2013/93272* (2020.01); *G01S 2013/93273* (2020.01); *G01S 2013/93274* (2020.01)

(58) Field of Classification Search
CPC .... G01S 13/862; G01S 13/865; G01S 13/867; G01S 2013/93272; G01S 2013/93273; G01S 2013/93274; G01S 2013/9317; G01S 2013/9315; G01S 13/86; B60W 60/001; B60W 2420/408; B60W 2420/403; B60W 2420/54; B60W 60/00; B60R 11/0247; B60R 11/04; B60R 2011/004; B60R 11/00; B60R 11/02
USPC ........................................................ 348/148
See application file for complete search history.

(56) References Cited

U.S. PATENT DOCUMENTS

| | | | |
|---|---|---|---|
| 6,911,997 B1 * | 6/2005 | Okamoto | B60R 1/00 |
| | | | 348/E7.086 |
| 8,624,716 B2 | 1/2014 | Englander | |
| 9,437,055 B2 | 9/2016 | Kuehnle et al. | |
| 10,127,463 B2 | 11/2018 | Fursich | |
| 10,218,940 B2 * | 2/2019 | Koravadi | H04N 7/181 |
| 11,772,574 B2 * | 10/2023 | Berne | G03B 17/561 |
| | | | 396/428 |
| 2005/0146607 A1 * | 7/2005 | Linn | B60R 1/00 |
| | | | 348/148 |
| 2018/0081371 A1 * | 3/2018 | Bar-Tal | G05D 1/0253 |
| 2019/0056736 A1 * | 2/2019 | Wood | G05D 1/0246 |
| 2019/0129429 A1 * | 5/2019 | Juelsgaard | G01S 17/00 |
| 2019/0208136 A1 * | 7/2019 | Wendel | H04N 9/8042 |
| 2019/0384313 A1 * | 12/2019 | Toth | G05D 1/0088 |
| 2021/0078504 A1 * | 3/2021 | Skaradzinski | B60R 11/04 |
| 2021/0201054 A1 * | 7/2021 | Toth | G01S 17/931 |
| 2021/0291738 A1 * | 9/2021 | Lang | B60R 1/12 |

\* cited by examiner

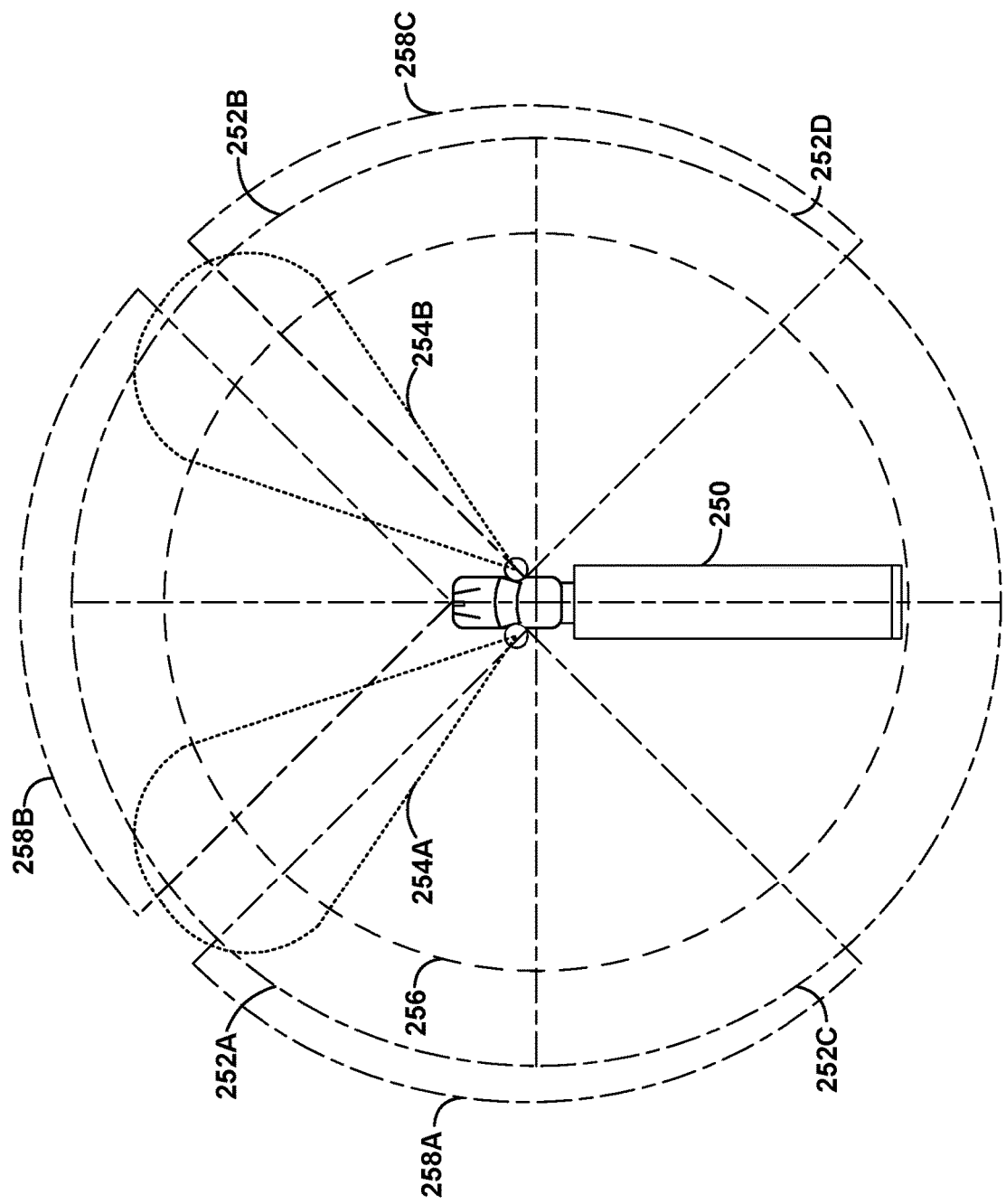

CAPTURE DATA USING A SENSOR ASSEMBLY, THE SENSOR ASSEMBLY COMPRISING AN ASSEMBLY HOUSING DEFINING AN ENCLOSURE CONTAINING A PLURALITY OF SENSORS AND DEFINING AN EXTERIOR SURFACE THROUGH WHICH THE SENSORS ARE CONFIGURED TO PERFORM IMAGING FROM A FRONT PORTION OF A VEHICLE, THE VEHICLE HAVING A FORWARD DIRECTION AND A BACKWARD DIRECTION, EACH SENSOR HAVING A RESPECTIVE FIELD OF VIEW (FOV) BASED ON A RESPECTIVE IMAGING DIRECTION OF THE SENSOR, EACH SENSOR'S IMAGING DIRECTION INTERSECTING THE EXTERIOR SURFACE OF THE ASSEMBLY HOUSING AT A RESPECTIVE POINT DEFINING A RESPECTIVE FOV ORIGIN OF THE SENSOR, THE PLURALITY OF SENSORS COMPRISING A FIRST SENSOR AND A SECOND SENSOR, AND THE SENSOR ASSEMBLY BEING DISPOSED AT THE FRONT PORTION OF THE VEHICLE SUCH THAT (i) THE FIRST AND SECOND SENSORS' FOV ORIGINS ARE EACH OUTBOARD FROM THE VEHICLE, (ii) THE FIRST AND SECOND SENSORS' IMAGING DIRECTIONS ARE EACH WITHIN 90 DEGREES IN YAW OF BEING PARALLEL TO THE BACKWARD DIRECTION OF THE VEHICLE, (iii) THE FIRST SENSOR'S IMAGING DIRECTION IS CLOSER IN YAW THAN THE SECOND SENSOR'S IMAGING DIRECTION TO BEING PARALLEL TO THE BACKWARD DIRECTION OF THE VEHICLE, AND (iv) THE FIRST SENSOR'S FOV ORIGIN IS MORE OUTBOARD FROM THE VEHICLE THAT THE SECOND SENSOR'S FOV ORIGIN — 1000

TRANSMIT THE CAPTURED DATA TO AN IMAGE PROCESSING SYSTEM THAT IS CONFIGURED TO PROCESS THE CAPTURED DATA — 1002

FIG. 10

MULTI-SENSOR ASSEMBLY WITH IMPROVED BACKWARD VIEW OF A VEHICLE

BACKGROUND

Unless otherwise indicated herein, the description in this section is not admitted to be prior art by inclusion in this section.

To facilitate navigation and control of vehicles, including but not limited to long vehicles such as semi-trucks (e.g., tractor-trailer combinations), it may be useful to mount one or more sensor assemblies comprising multiple cameras and/or other sensors to a front or other portion of the vehicle, with the sensors being configured to cooperatively provide a view of the surrounding environment, allowing for object detection, localization, characterization, and classification, and for monitoring the vehicle itself.

Without limitation, having the sensor assembly be mounted to a front portion of the vehicle could be especially useful where the front portion of the vehicle is itself detachably coupled with a rear portion of the vehicle. For instance, with a semi-truck, it could be convenient for one or more such sensor assemblies to be mounted to the tractor, because the tractor may from time to time be detachably coupled with any of various trailers. In practice, for instance, a bar could be mounted above the front windshield of the tractor, extending from one side of the tractor to the other, and sensor assemblies could be attached to the ends of the bar, so that one sensor assembly could provide a view from a front left portion of the tractor and another sensor assembly could provide a view from a front right portion of the tractor.

SUMMARY

Sensors mounted to a front portion of a vehicle or otherwise forward of the rear of the vehicle may facilitate detecting objects at various positions around the vehicle and may also facilitate monitoring the state of a rear portion of the vehicle. Unfortunately, however, the sensors may have a limited view behind the vehicle or a limited view of the side of the vehicle itself. One reason for this is that the sensors may be relatively close to the vehicle itself, i.e., at relatively short outboard distances from the vehicle, so that the angle between each sensor's imaging direction (e.g., optical axis or ranging direction) and the side of the vehicle may be relatively acute. This may be most problematic for the sensor that has the most backward-facing imaging direction. Therefore, in order to provide an improved view behind the vehicle and perhaps along the side of the vehicle, it may be better if the sensor assembly were configured such that, of multiple sensors that have at least partly backward-facing imaging directions, the sensor that has the most backward-facing imaging direction has a field of view that originates farthest from the vehicle, i.e., has a "FOV origin" that is most outboard from the vehicle. Disclosed herein is such a sensor assembly, as well as an associated system and method. The disclosed sensor assembly could be usefully implemented at or near a front portion of a vehicle or at or near another portion of the vehicle, perhaps elsewhere at or near the side of the vehicle, including possibly closer to the rear of the vehicle.

In one aspect, for instance, a sensor assembly is provided. The sensor assembly includes an assembly housing that defines an enclosure containing a plurality of sensors and defining an exterior surface through which the sensors are configured to perform imaging from a portion of a vehicle. The vehicle has a forward direction and a backward direction, and each sensor has a respective field of view (FOV) based on a respective imaging direction of the sensor (e.g., centered on the imaging direction), with each sensor's imaging direction intersecting the exterior surface of the assembly housing at a respective point defining a respective FOV origin of the sensor. Further, the plurality of sensors comprises a first sensor and a second sensor. This sensor assembly is configured to be disposed at the portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction axis to being parallel to the backward direction of the vehicle, and (iv) the first sensor's FOV origin is more outboard from the vehicle that the second sensor's FOV origin.

In another aspect, an imaging system is provided. The imaging system includes a sensor assembly and an image processing system. The sensor assembly comprises an assembly housing defining an enclosure containing a plurality of sensors and defining an exterior surface through which the sensors are configured to perform imaging from a portion of a vehicle. The vehicle has a forward direction and a backward direction, and each sensor has a respective FOV based on a respective imaging direction of the sensor, with each sensor's imaging direction intersecting the exterior surface of the assembly housing at a respective point defining a respective FOV origin of the sensor. Further, the plurality of sensors comprises a first sensor and a second sensor. This sensor assembly is disposed at the portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction to being parallel to the backward direction of the vehicle, and (iv) the first sensor's FOV origin is more outboard from the vehicle that the second sensor's FOV origin. Still further, the imaging processing system is configured to receive and process data generated by the plurality of sensors.

In yet another aspect, a method is provided. The method includes capturing data using a sensor assembly. The sensor assembly comprises an assembly housing defining an enclosure containing a plurality of sensors and defining an exterior surface through which the sensors are configured to perform imaging from a portion of a vehicle. The vehicle has a forward direction and a backward direction, and each sensor has a respective FOV based on a respective imaging direction of the sensor, with each sensor's imaging direction intersecting the exterior surface of the assembly housing at a respective point defining a respective FOV origin of the sensor, and the plurality of sensors comprises a first sensor and a second sensor. Further, the sensor assembly is disposed at the portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction to being parallel to the backward direction of the vehicle, and (iv) the first sensor's FOV origin is more outboard from the vehicle that the second sensor's FOV origin. In addition, the method includes transmitting the captured data to an image processing system that is configured to process the captured data.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 2J is an illustration of a field of view for various sensors, according to example embodiments.

FIG. 10 is a flow chart illustrating an example method, according to example embodiments.

DETAILED DESCRIPTION

Figure 1:
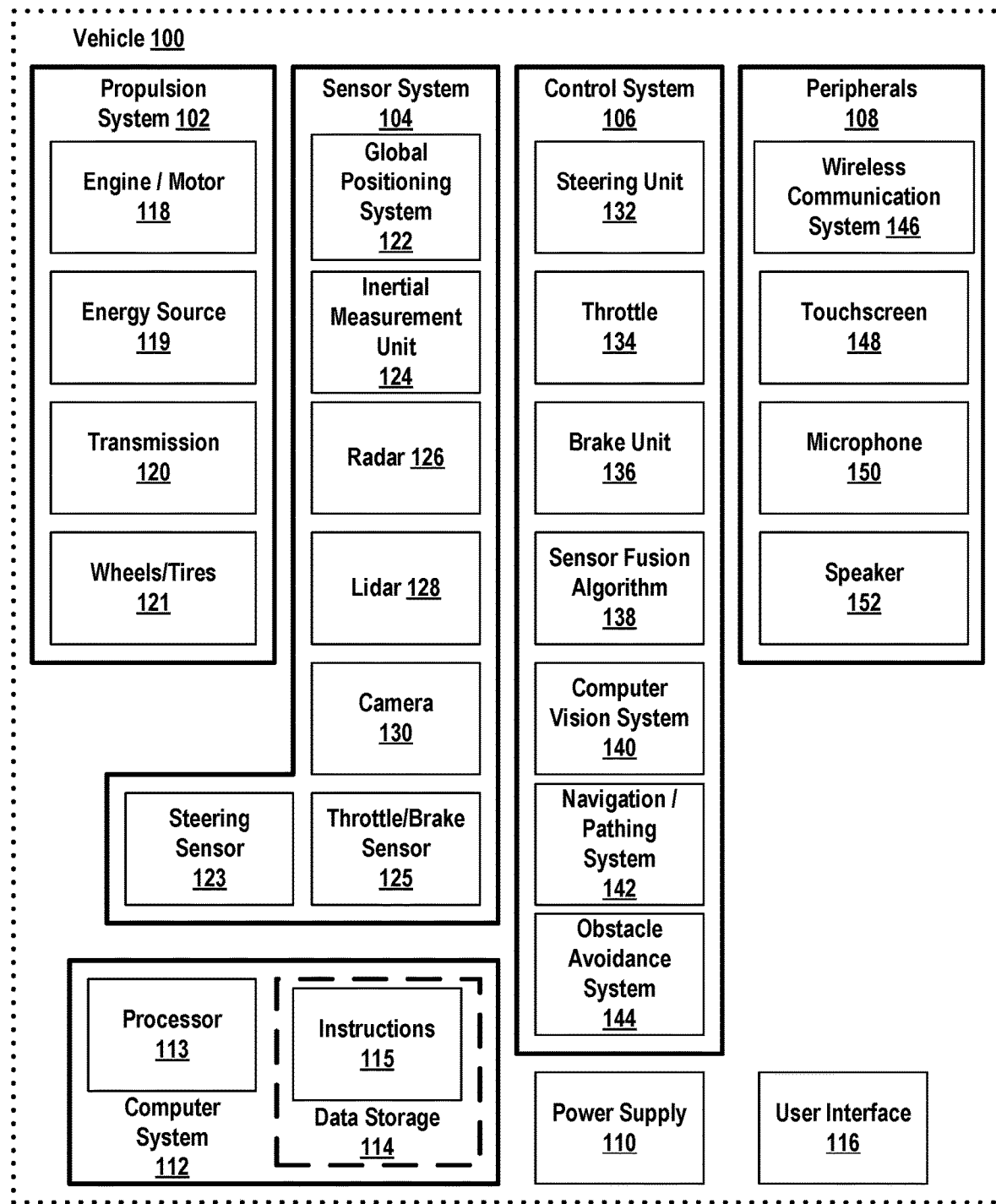
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Example embodiments relate to a sensor assembly configured to provide imaging from a portion of a vehicle.

As noted above, mounting sensors to the vehicle may facilitate detecting objects at various positions in relation to the vehicle. For instance, as to a vehicle that would be driven on a road, the sensors so mounted may facilitate detecting other vehicles, pedestrians, lane markers, obstructions, signs, or other objects in front of the vehicle, to the side of the vehicle, and at least partly behind the vehicle. Further, mounting sensors forward of the rear of the vehicle (e.g., at a front side, or elsewhere at or near the side of the vehicle) may also facilitate monitoring the state of a rear portion of the vehicle. For instance, as to a semi-truck, front-mounted sensors with a FOV encompassing a side of the trailer may facilitate monitoring the yaw and roll of the trailer in relation to the tractor, by monitoring predefined markings on the side of the trailer.

Unfortunately, as further noted above, a technical problem is that the sensors may have a limited view behind the vehicle and/or a limited view of the side of the vehicle itself. With a semi-truck, for instance, sensors mounted at the front left and front right of the tractor may have limited views behind the trailer and may also have a limited view along the side of the trailer. Further, as noted above, a reason for this problem may be that, of multiple sensors in the assembly that have at least partly backward-facing imaging directions, the sensor that has the most backward-facing imaging direction may be relatively close to the vehicle, such that its view would be relatively acute relative to the side of the vehicle.

As indicated above, a technical solution to this problem is to configure the sensor assembly such that, of its multiple sensors that have at least partly backward-facing imaging directions, the sensor that has the most backward-facing imaging direction has its FOV origin farthest from the vehicle (i.e., most outboard from the vehicle).

The sensor assembly could be so configured to be disposed at a portion of a vehicle such as, but not limited, to a tractor-trailer or other long vehicle. Having the FOV origin of the sensor with the most backward-facing imaging direction be most outboard from the vehicle may help to provide a wider view behind the vehicle (e.g., covering more of the blind spot behind the vehicle) and may also help to provide a wider view along a side of the vehicle.

Without limitation, one way to so configure the sensor assembly is to have the sensor with the most backward-facing imaging direction be positioned more outboard from the vehicle than a sensor with a less backward-facing imaging direction. For instance, if the sensor assembly when disposed at a front portion of the vehicle includes a first sensor having a directly backward-facing imaging direction, i.e., having yaw parallel with the background direction of the vehicle, and a second sensor having an imaging direction that is, by way of example, 45 degrees in yaw from being parallel with the backward direction of the vehicle, the sensor assembly could be structured such that the first sensor is more outboard from the vehicle than the second sensor.

Also without limitation, another way to so configure the sensor assembly is to include in the sensor assembly one or more mirrors, prisms, or other imaging-redirection mechanism to cause the FOV origin of the sensor that has the most backward-facing imaging direction to be farther outboard from the vehicle than the FOV origin of another sensor that has a less backward-facing imaging direction. For instance, the sensor assembly when disposed at a front or other portion of the vehicle could be structured with (i) a first sensor and one or more imaging-redirection mechanisms configured to give the first sensor a directly backward imaging direction and a FOV origin that is at first outboard distance from the vehicle, and (ii) a second sensor that has an imaging direction that is 45 degrees in yaw from being parallel with the backward direction of the vehicle and having a FOV origin that is at a second outboard distance from the vehicle, with the second outboard distance being shorter than the first outboard distance. Alternatively, the sensor assembly when disposed at a front or other portion of the vehicle could be structured with (i) a first sensor having a directly backward imaging direction and a FOV origin that is at a first outboard distance from the vehicle, and (ii) a second sensor and one or more imaging-redirection mechanisms configured to give the second sensor an imaging direction at 45 degrees in yaw of being parallel with the backward direction of the vehicle and a FOV origin that is at a second outboard distance from the vehicle, with the second outboard distance being shorter than the first outboard distance.

The example sensor assembly could also include additional sensors. For instance, the example sensor assembly could be configured with sensors having imaging directions and fields of view cooperatively spanning 360 degrees in yaw, or the example sensor assembly could omit one or more sensors that would have obstructed or irrelevant views. Additionally or alternatively, the sensors included in the example sensor assembly could be of various types. For instance, the sensors could comprise one or more cameras, lidar devices, radar devices, microphone devices, sonar devices, and/or other types of sensors now known or later developed. Each such sensor could be considered to have a respective imaging direction and FOV origin, even if the sensor does not itself capture a traditional image. For instance, for lidar devices, a sensor's imaging direction could be its ranging direction, and the sensor's FOV origin could be where its ranging direction intersects the sensor assembly housing, among other possibilities. It is also possible that sensor modalities that do not interfere with each other may use the same or overlapping FOV, FOV origin, and/or imaging direction.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in connection with or may take the form of an automobile. Additionally, an example system may also be implemented in connection with or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, and one or more machine-learned models) operable to process and analyze images in an effort to determine objects that are in motion (e.g., other vehicles, pedestrians, bicyclists, and animals) and objects that are not in motion (e.g., traffic lights, roadway boundaries, speed-bumps, and potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle, and a semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones, and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; and one or more lidars, cameras, and radars).

Note that the number, location, and type of sensor systems (e.g., 202, and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, and to adapt to specialized environmental or application circumstances). For example, the sensor systems (e.g., 202, and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204,

206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, and 210), to actively scan the environment near the back of the vehicle 200 for the presence of radio-reflective objects. Similarly, one or more radars can be located near the front of the vehicle 200 (e.g., sensor systems 212, and 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, and microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, and alarms) upon which control strategy for vehicle 200 may be based. For example, if the acoustic sensor detects a siren (e.g., an ambulatory siren, and a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
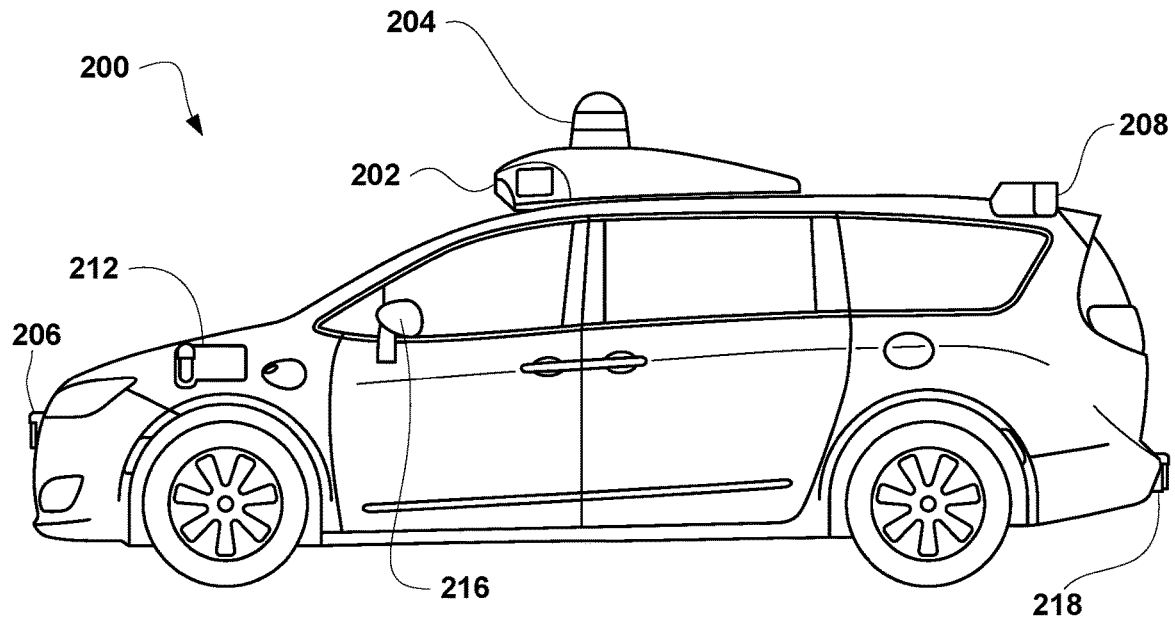
FIG. 2A is an illustration of a physical configuration of a vehicle, according to example embodiments.
Figure 2B:
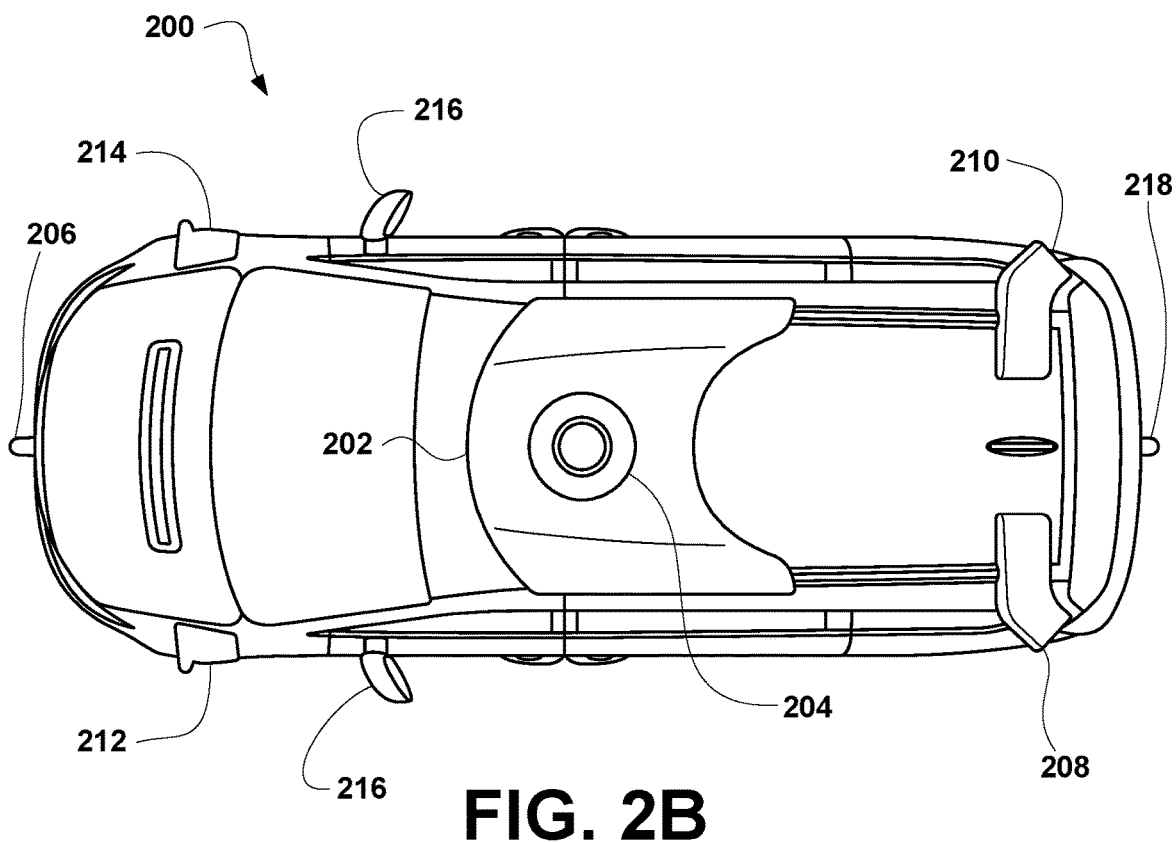
FIG. 2B is an illustration of a physical configuration of a vehicle, according to example embodiments.
Figure 2C:
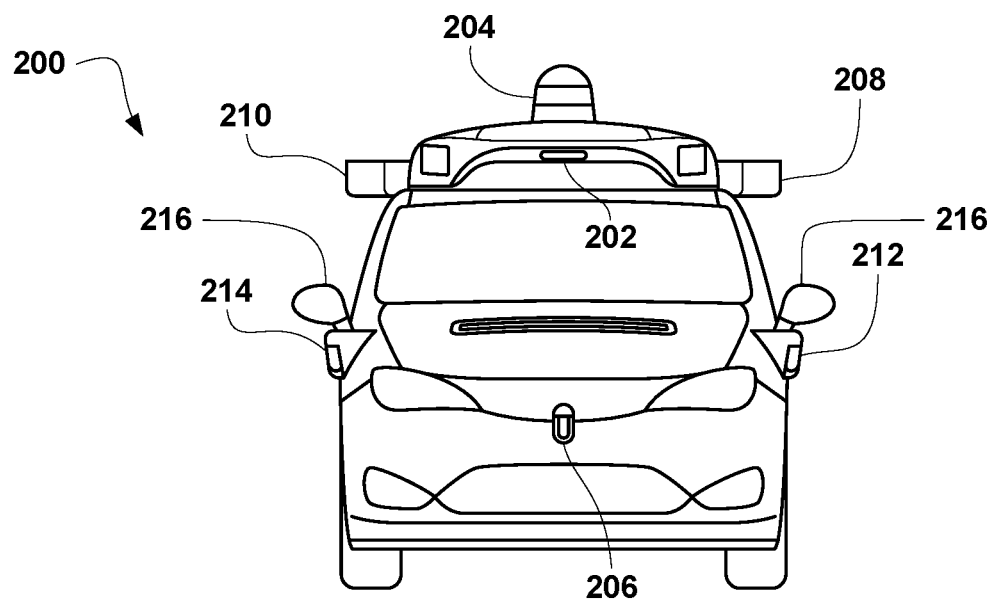
FIG. 2C is an illustration of a physical configuration of a vehicle, according to example embodiments.
Figure 2D:
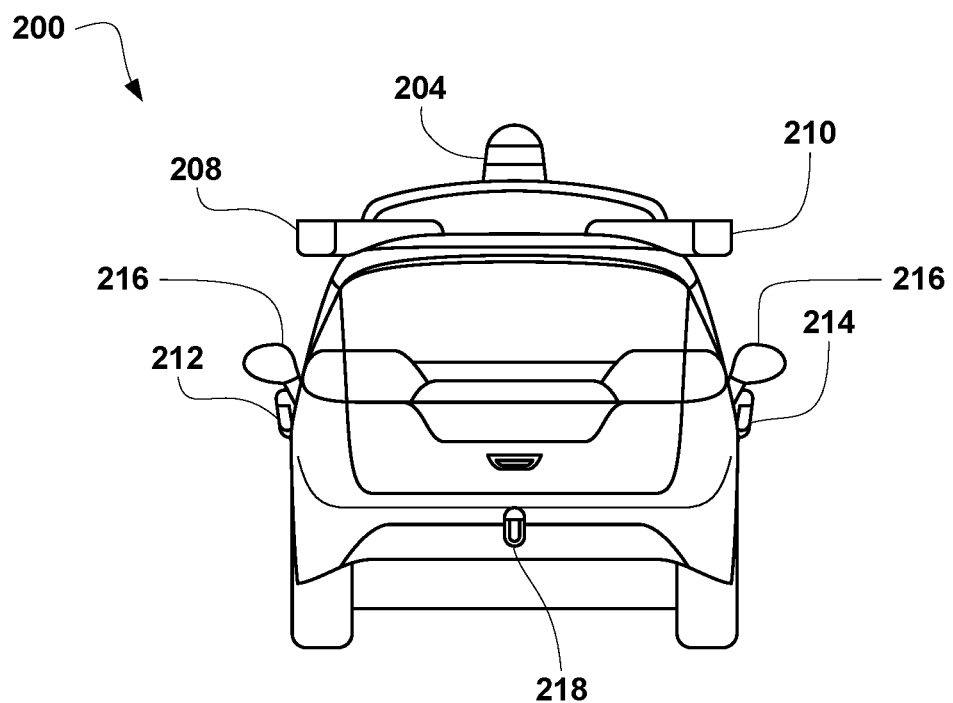
FIG. 2D is an illustration of a physical configuration of a vehicle, according to example embodiments.
Figure 2E:
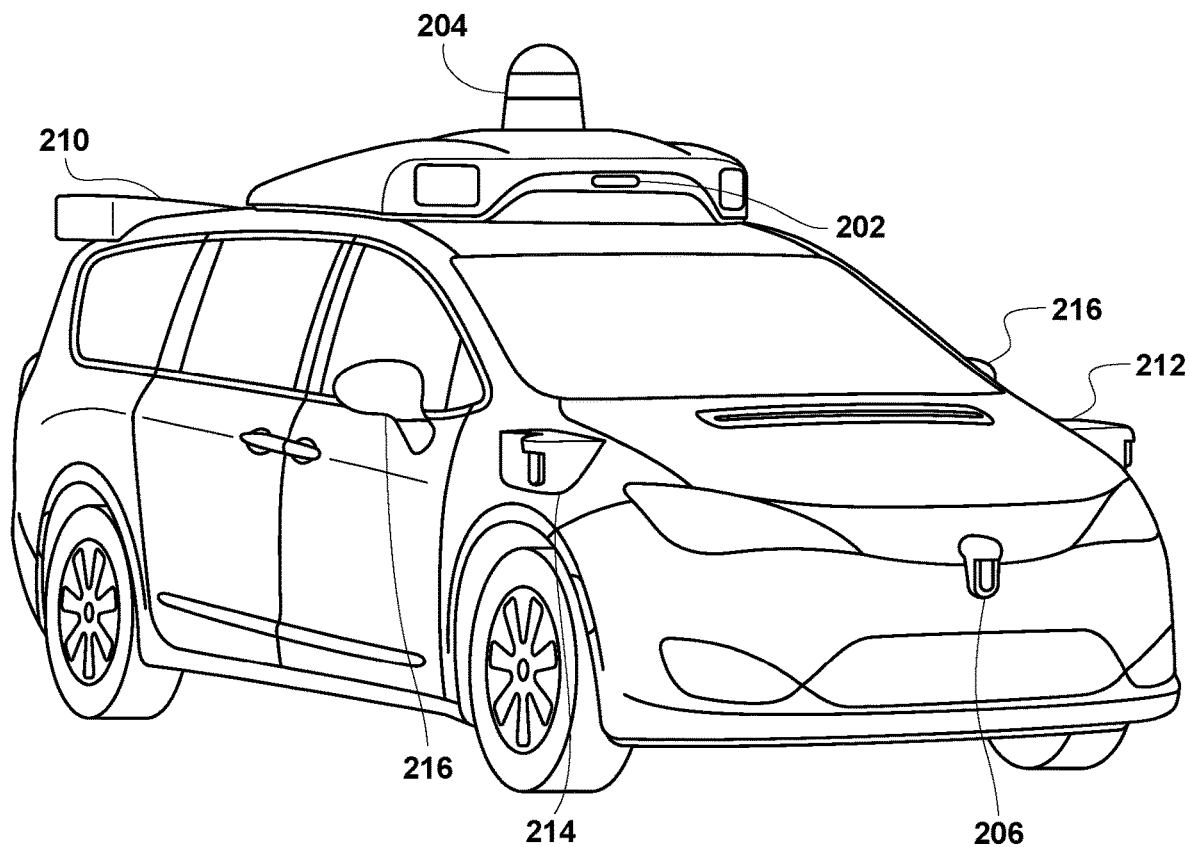
FIG. 2E is an illustration of a physical configuration of a vehicle, according to example embodiments.
Figure 2F:
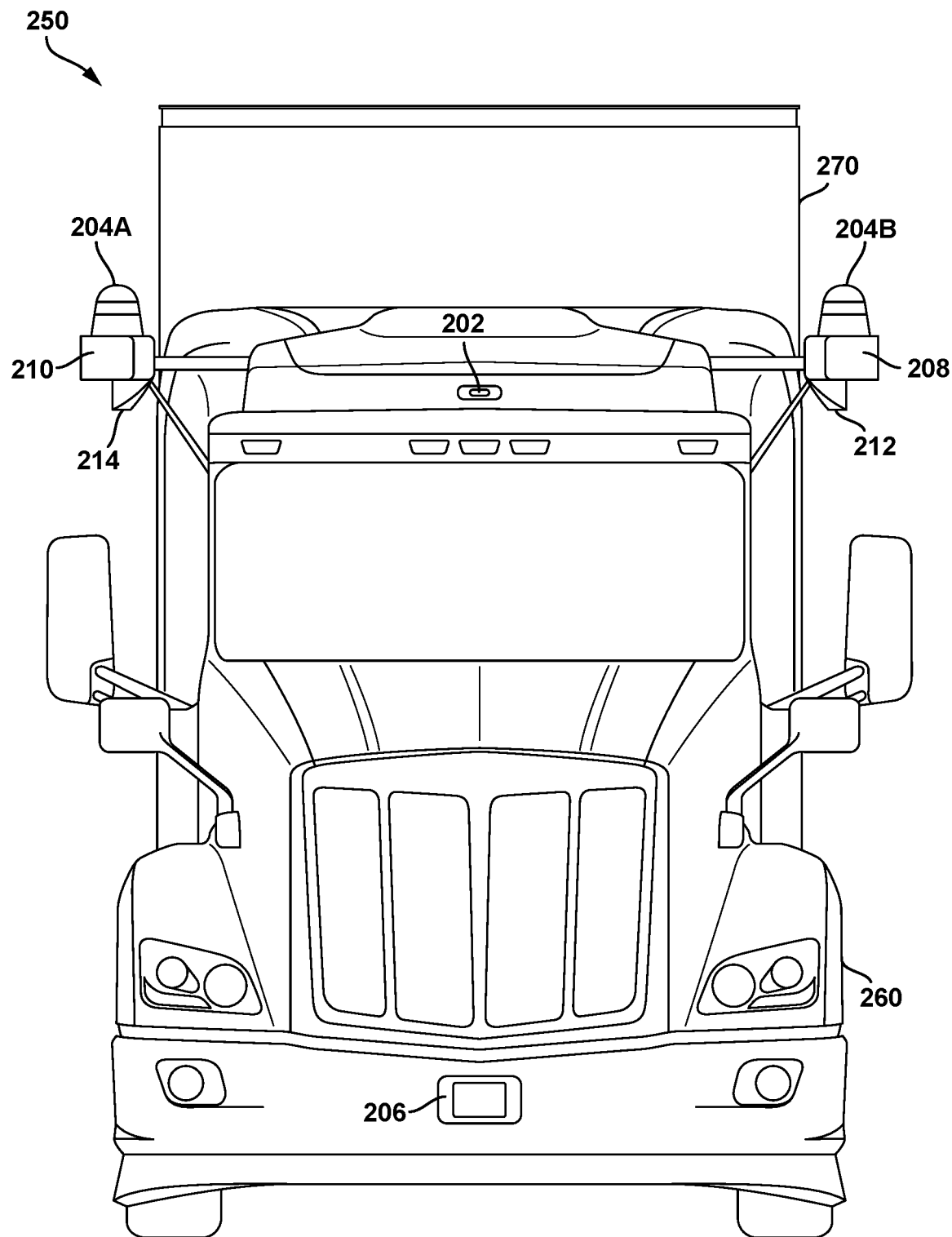
FIG. 2F is an illustration of a physical configuration of a vehicle, according to example embodiments.
Figure 2G:
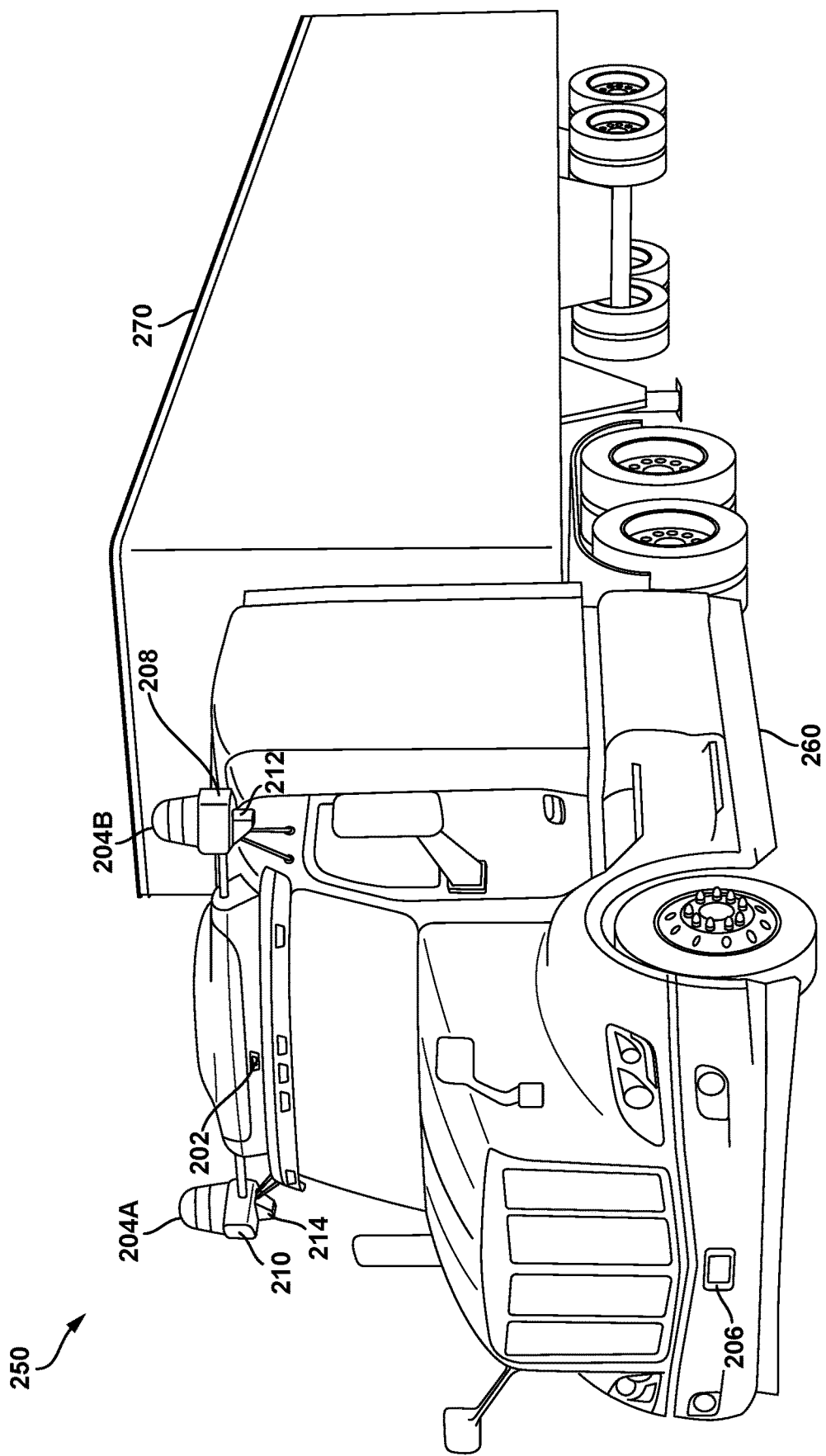
FIG. 2G is an illustration of a physical configuration of a vehicle, according to example embodiments.
Figure 2H:
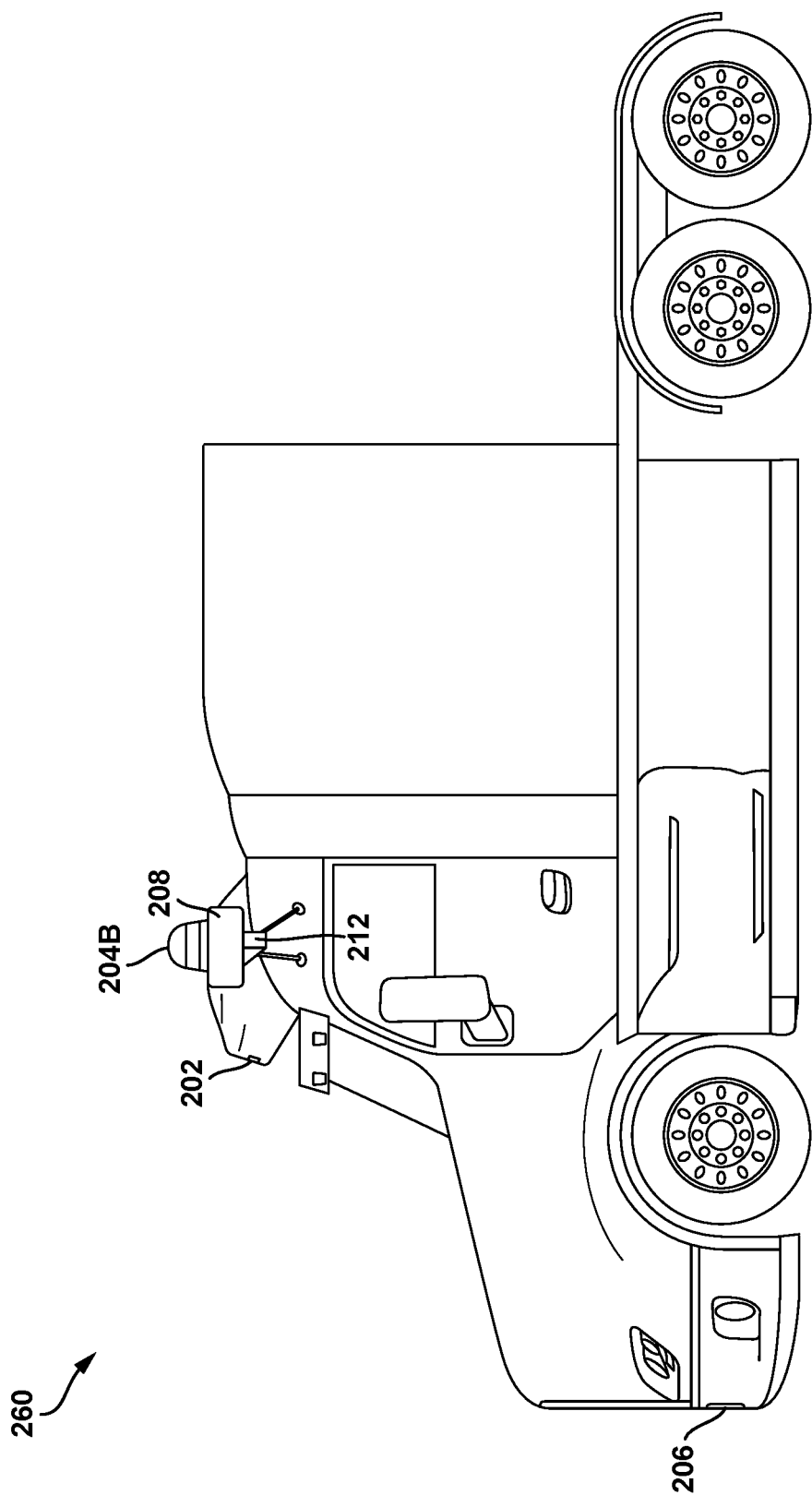
FIG. 2H is an illustration of a physical configuration of a vehicle, according to example embodiments.
Figure 2I:
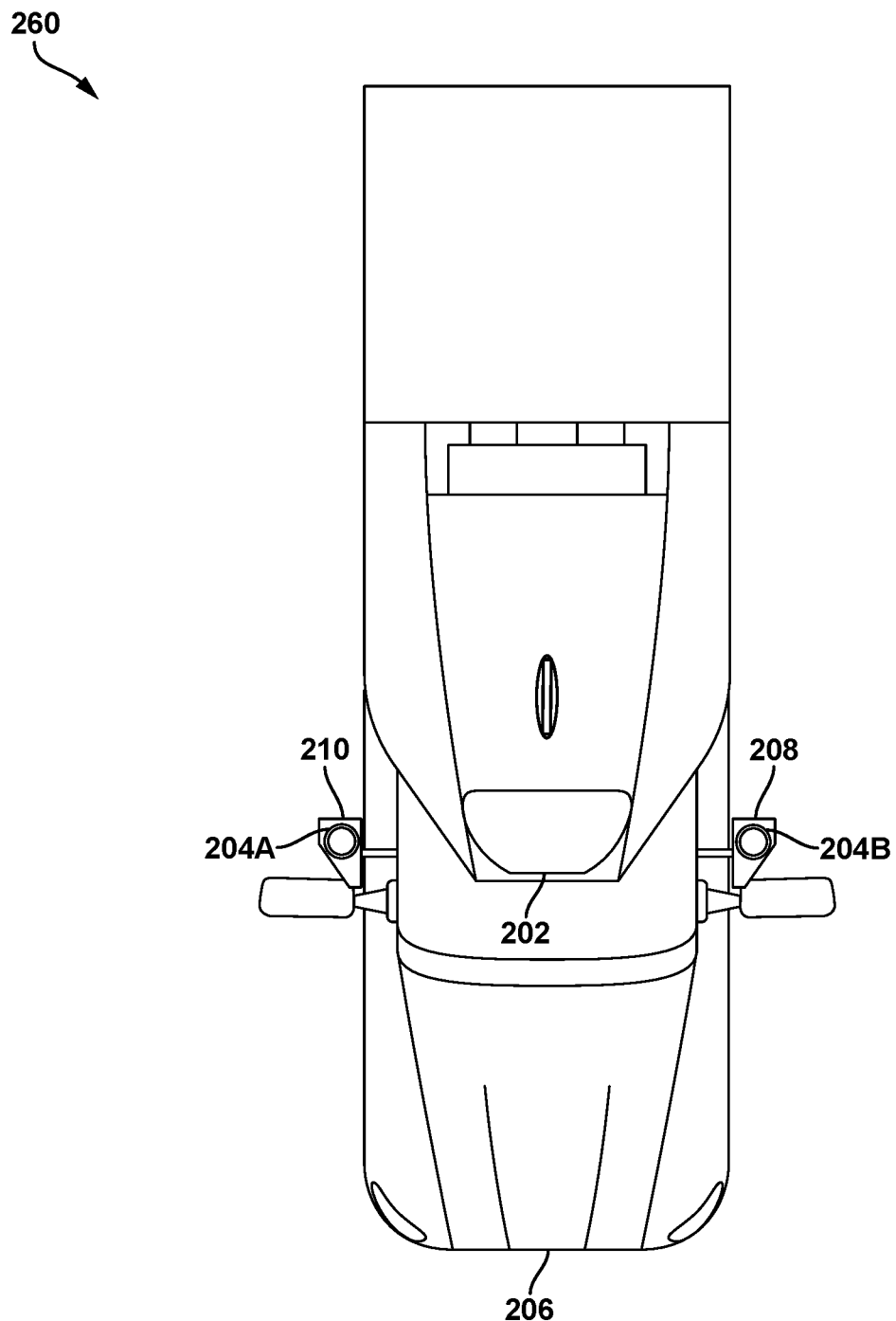
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
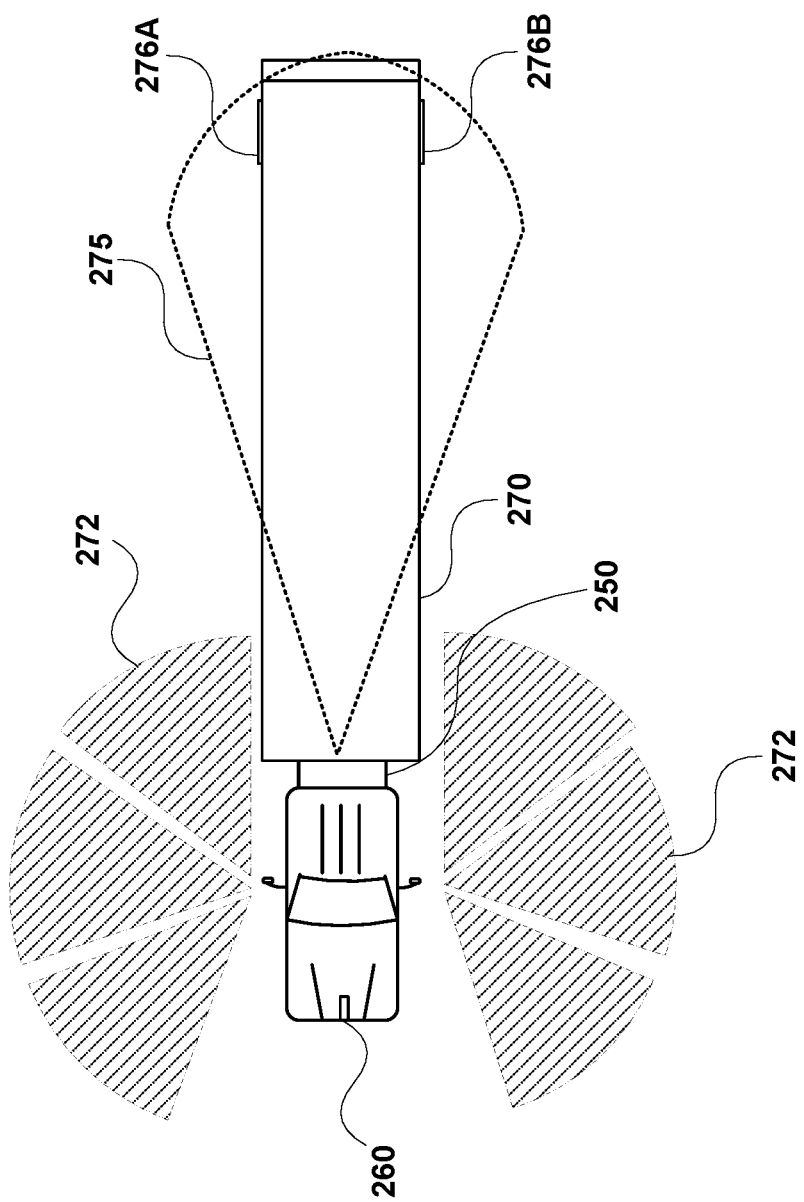
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
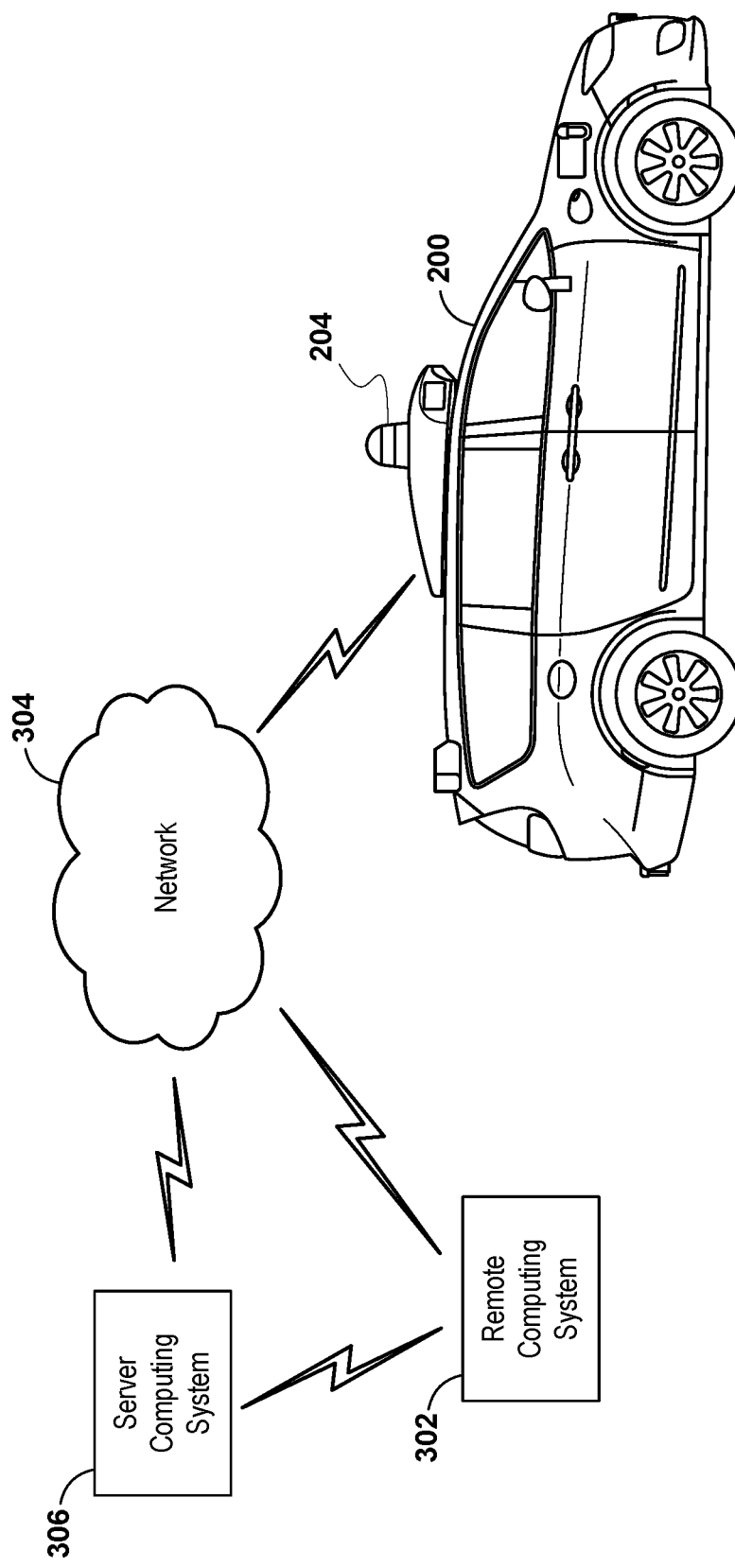
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, and a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

As noted above, technical issues with rear and side visibility could arise in connection with a sensor assembly mounted to a front or other portion of a representative vehicle, especially but not limited to a long vehicle (e.g., a semi-truck vehicle 250).

Figure 4A:
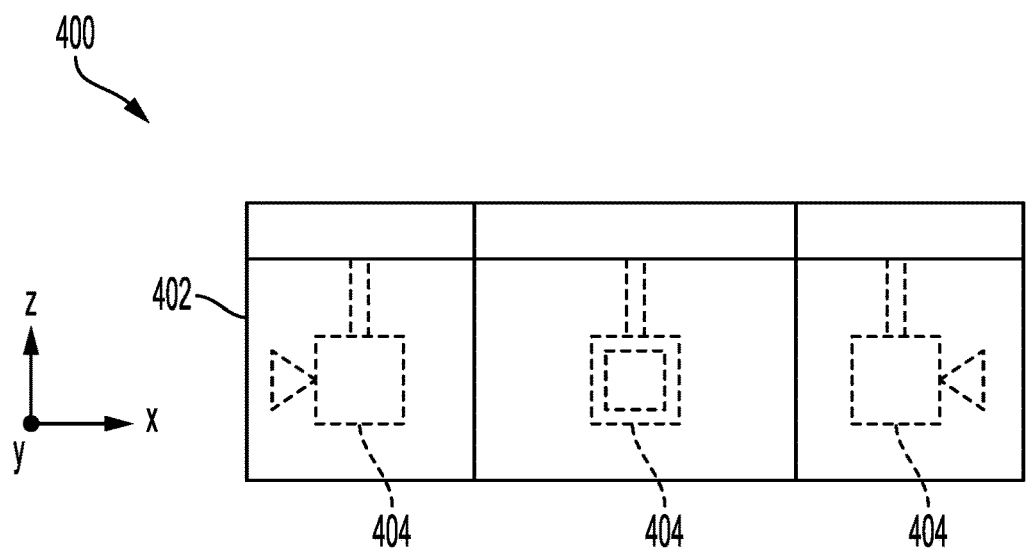
FIG. 4A is a side view of an example sensor assembly, according to example embodiments.
Figure 4B:
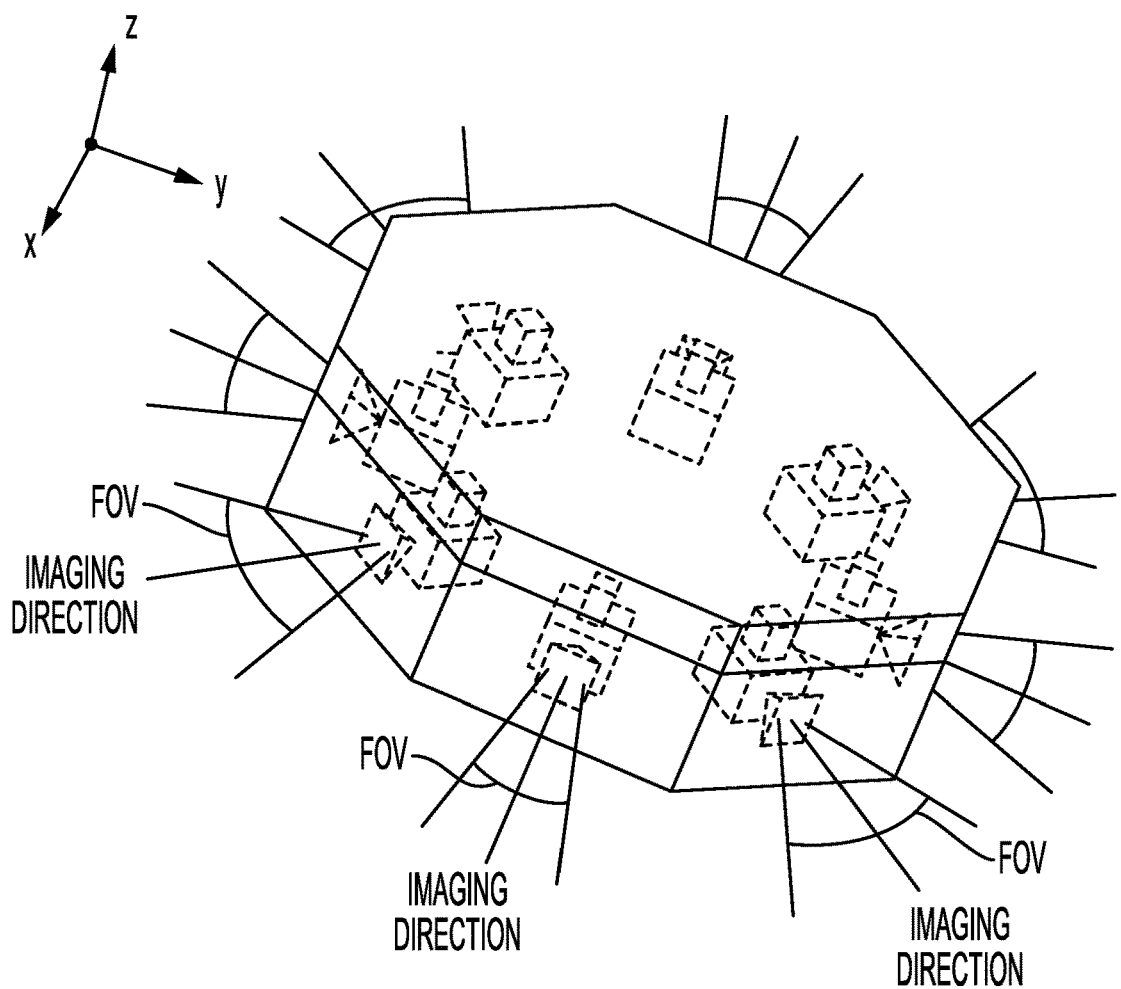
FIG. 4B is a cutaway top view of the example sensor assembly of FIG. 4A, according to example embodiments.
Figure 4C:
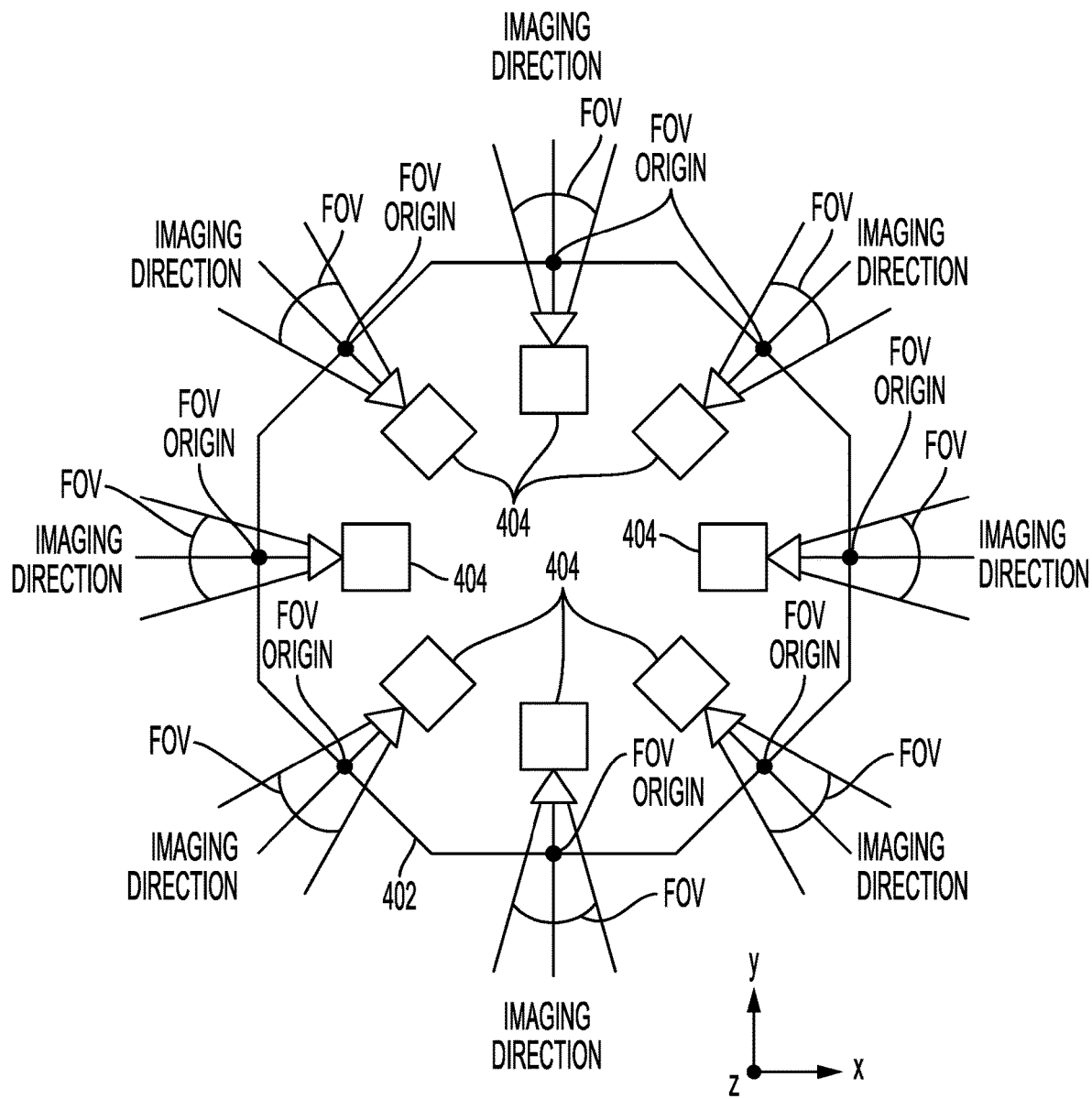
FIG. 4C is an isometric view of the example sensor assembly of FIG. 4A, according to example embodiments.

Without limitation, these issues could arise where the sensor assembly mounted to the vehicle contains a group of sensors arranged in an octagonal, circular, or other such formation in a substantially horizontal plane and with the sensors' imaging directions extending substantially radially from the formation. FIGS. 4A-C illustrate an example of such a sensor assembly 400, and FIGS. 5A-B illustrate front left and right mounting locations for the example sensor assembly 400 relative to an example semi-truck 250.

As shown in FIGS. 4A-C, the example sensor assembly 400 includes a sensor-assembly housing 402 containing multiple sensors 404 that have respective imaging directions configured to sense objects in a surrounding environment. The example sensor assembly housing 402 defines a protective housing surface made of plastic, glass, or another material that protects the sensors from weather and debris. In some embodiments, the protective housing surface may be transparent, partly transparent, or otherwise configured to allow the sensors to perform sensing through the housing surface.

Further, as shown in FIGS. 4B and 4C, the example sensor assembly 400 is largely octagonal and contains eight sensors arranged in an octagonal formation. Each sensor has a respective imaging direction (e.g., optical axis) that radiates out from the sensor assembly, intersecting the sensor housing at a point, thereby defining a respective FOV origin of the sensor. Further, each sensor has a respective FOV, which may be centered on the sensor's imaging direction. Though the sensors' FOVs are shown relatively narrow, the sensors' FOVs could be wide enough to partly overlap with each other, so that data from the multiple sensors could be stitched together to provide a substantially contiguous view of the surrounding environment. For example, each sensor's FOV could be about 90 degrees wide, among other possibilities, and the sensors' FOVs could be the same width as each other or could be vary.

Figure 5A:
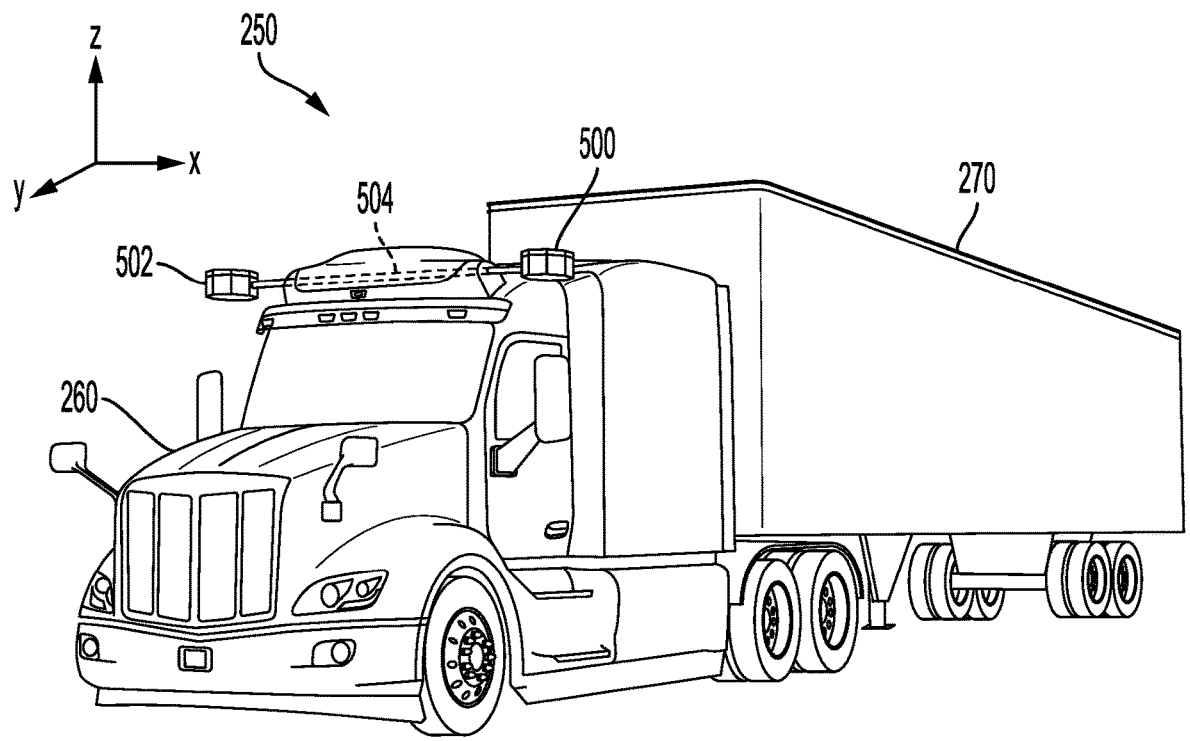
FIG. 5A is an isometric view of example sensor assemblies mounted to an example vehicle, according to example embodiments.
Figure 5B:
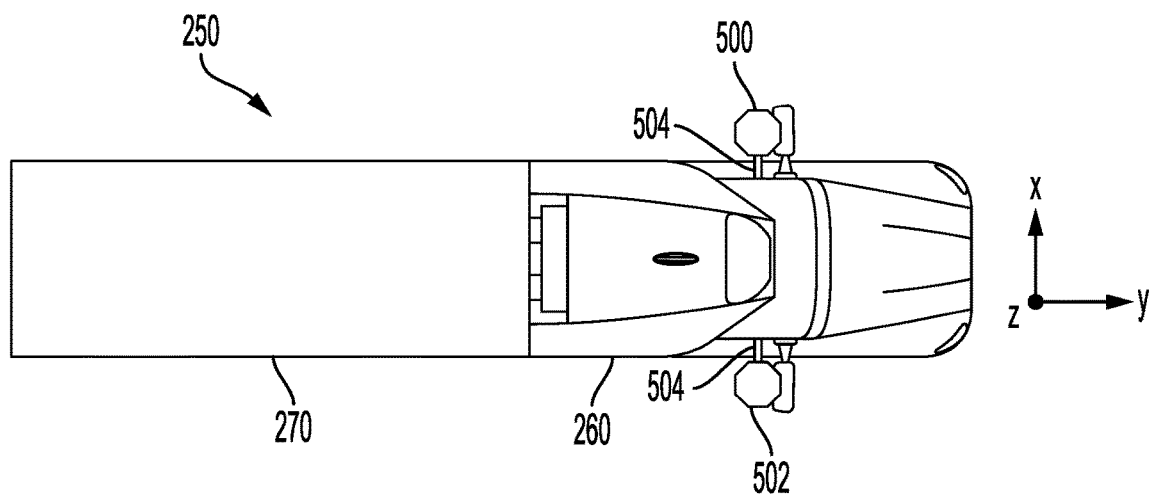
FIG. 5B is a top view of the arrangement shown in FIG. 5A, according to example embodiments.

As shown next in FIGS. 5A and 5B, two example sensor assemblies 500, 502 could be mounted to a front portion of a semi-truck 250 at positions similar to the sensor systems 208, 210 discussed above and illustrated in FIGS. 2F-I. In particular, a rigid bar 504 could be mounted near the top of the tractor 260 and extend a distance outboard from each side of the tractor 260. In such embodiments, the sensor assemblies 500, 502 could be mounted to the ends of the bar 504, so that one sensor assembly 500 is disposed outboard of the front left region of the tractor 250 and the other sensor assembly 502 is disposed outboard of the front right region of the tractor 250. Alternatively, separate bars or other mounting mechanisms could be provided per sensor assembly. As so mounted, each of these sensor assemblies could be oriented substantially parallel to the road or other surface on which the semi-truck 250 would travel.

Figure 6:
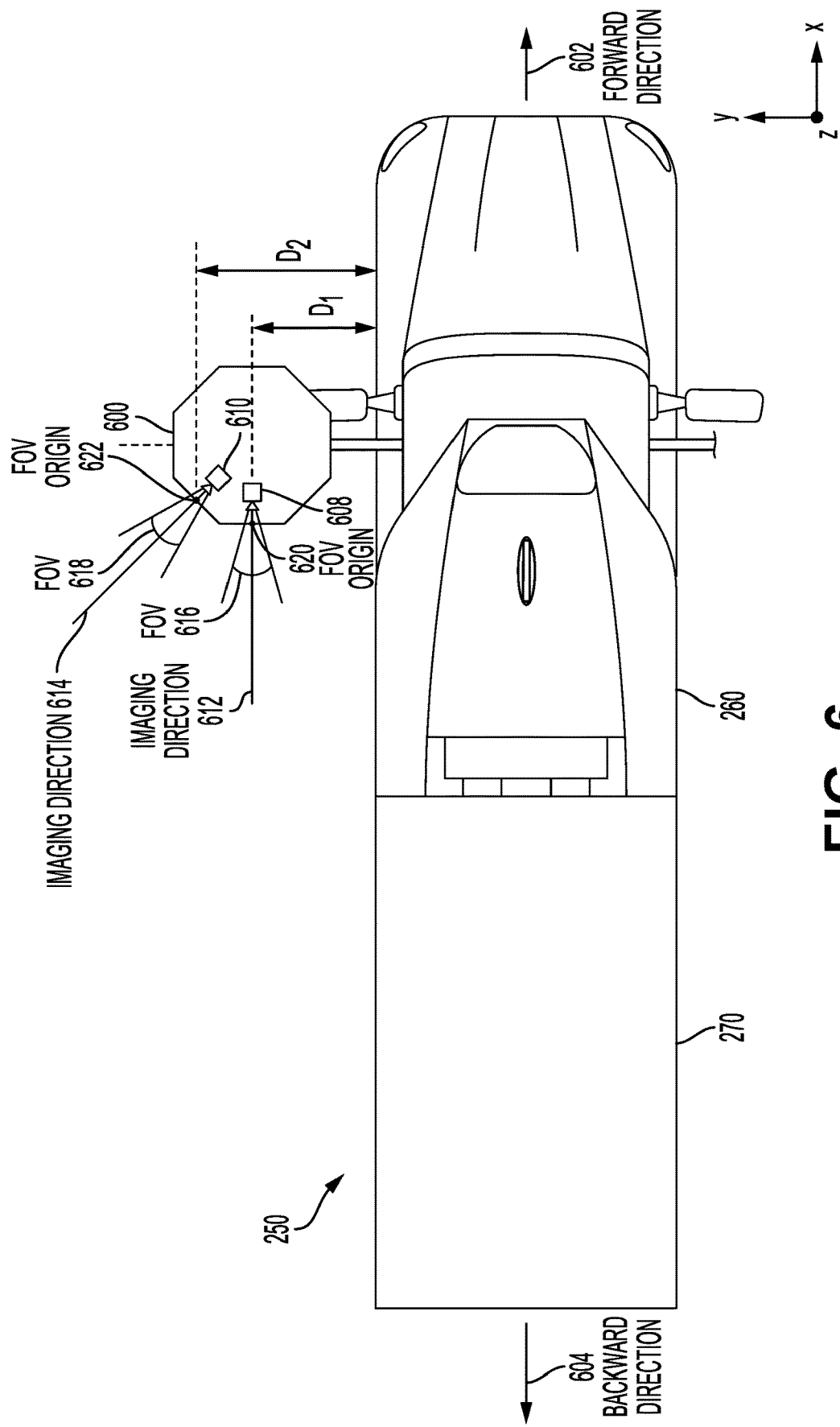
FIG. 6 is a top view showing relative FOV origins and imaging directions of example sensors in an example sensor assembly mounted to an example vehicle, according to example embodiments.

FIG. 6 is a top partial-cutaway view showing some of the sensors within an example sensor assembly 600 mounted at the front left portion of a semi-truck 250. To help show components in the sensor assembly 600, this figure illustrates the sensor assembly 600 larger than it might be in practice relative to the size of the semi-truck 250.

As shown in FIG. 6, the semi-truck 602 has a forward direction 602 and a backward direction 604. Further, as shown, at least two of the sensors 608, 610 within the sensor assembly 600 have at least partially backward-facing imaging directions, namely, imaging directions that are within 90 degrees in yaw of being parallel with the backward direction 606 of the semi-truck 250. In particular, in the example shown, sensor 608 has an imaging direction 612 that faces directly backward, parallel in yaw with the backward direction 604 of the semi-truck 250, and sensor 610 has an imaging direction 614 that is about 45 degrees in yaw from being parallel with the backward direction 604 of the semi-truck 250. (In an alternative implementation, these sensors may have different imaging directions; for instance, sensor 608 may not be directly backward facing, and sensor 610 may have an imaging direction of 30 degrees or some other angle.)

FIG. 6 also shows each of these sensors having a respective FOV largely centered on its imaging direction, namely, sensor 608 having a FOV 616 largely centered on its imaging direction 612, and sensor 610 having a FOV 618 largely centered on its imaging direction 614. In addition, each sensor in this arrangement is shown having a respective FOV origin defining a point where the sensor's imaging direction intersects the sensor-assembly housing. Namely, sensor 608 is shown having a FOV origin 620 defining the point where its imaging direction 612 intersects the sensor-assembly housing, and sensor 610 is shown having a FOV origin 622 defining the point where its imaging direction 614 intersects the sensor-assembly housing.

Of the two illustrated sensors in this example arrangement, the sensor 608 that has the most backward-facing imaging direction 612 has a FOV origin 620 that is closer to the semi-truck 250, i.e., less outboard from the semi-truck 250, than the FOV origin 622 of the other sensor 610 that has a less backward-facing imaging direction 614. In particular, as shown, the FOV origin 620 of sensor 608 is merely a distance $D_1$ from the left side of the semi-truck 250, whereas the FOV origin 622 of sensor 610 is a greater distance $D_2$ from the left side of the semi-truck 250.

Unfortunately, however, having the FOV origin 620 of the sensor 608 with the more backward-facing imaging direction 612 be so close to the semi-truck 250 may result in a relatively restricted view behind the trailer 270 and a relatively restricted view along the left side of the trailer 270.

Figure 7:
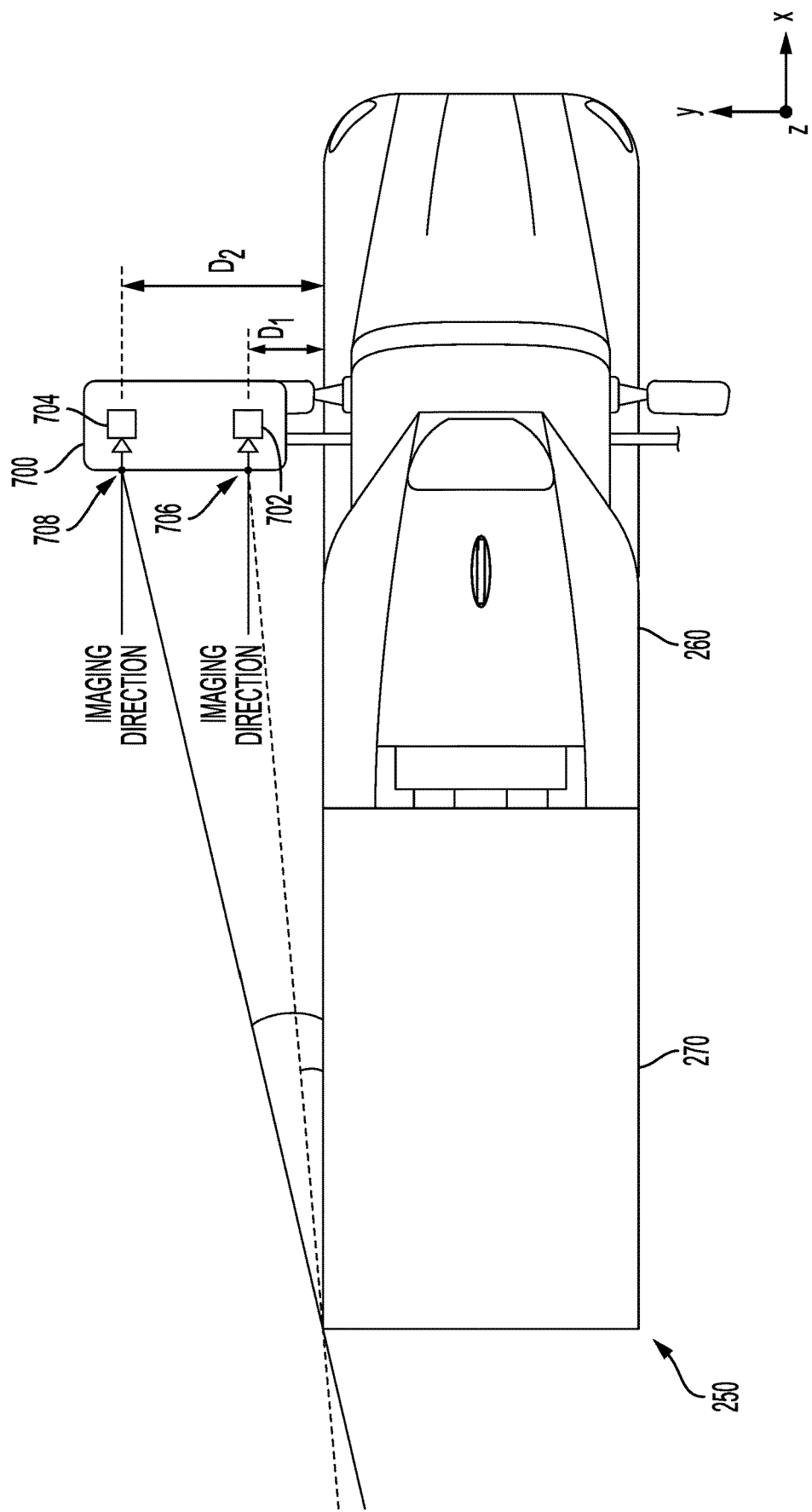
FIG. 7 is an illustration showing how a sensor with a FOV origin relatively close to the vehicle may have a relatively restricted view behind the vehicle and a relatively restricted view of a side of the vehicle, according to example embodiments.

FIG. 7 illustrates this problem. In particular, FIG. 7 shows an example sensor assembly 700 mounted to the front left portion of the semi-truck 250 and containing two example sensors 702, 704, each with a directly backward-facing imaging direction. It is understood that, for purpose of illustration, this example sensor assembly 700 is shown larger than it might in practice. Sensor 702 has a FOV origin 706 that is relatively close to the semi-truck 250, i.e., with a short outboard distance $D_1$, and as a result has a relatively narrow view behind the trailer 270 and a relatively acute view along the side of the trailer 270. Whereas, sensor 704 has a FOV origin 708 farther away from the semi-truck 250, i.e., with a longer outboard distance $D_2$, and as a result has a broader view behind the trailer 270 and a broader view along the side of the trailer 270.

In order to provide a better view behind the vehicle and a better view along the side of the vehicle, the sensor assembly could therefore be improved by configuring the FOV origin of the sensor that has a most backward-facing imaging direction to be most outboard from the vehicle.

Configuring the FOV origin of the sensor having the most backward-facing imaging direction to be most outboard from the vehicle may provide a broader view behind the vehicle, which may facilitate detecting of objects in a wider region behind the vehicle. In addition, configuring the FOV origin of the sensor having the most backward-facing imaging direction to be most outboard from the vehicle may provide a broader view of the side of the vehicle, which may facilitate improved sensing of the state of the vehicle (e.g., improved sensing of radio-reflective objects or other devices at various positions along the side of the vehicle).

As noted above, this could be done by positioning the sensor that has the most backward-facing imaging direction at a most outboard location within the sensor assembly or by using one or more mirrors, prisms, or other imaging-redirection mechanisms to cause the FOV origin of the sensor that has the most backward-facing imaging direction to be most outboard from the vehicle.

Figure 8:
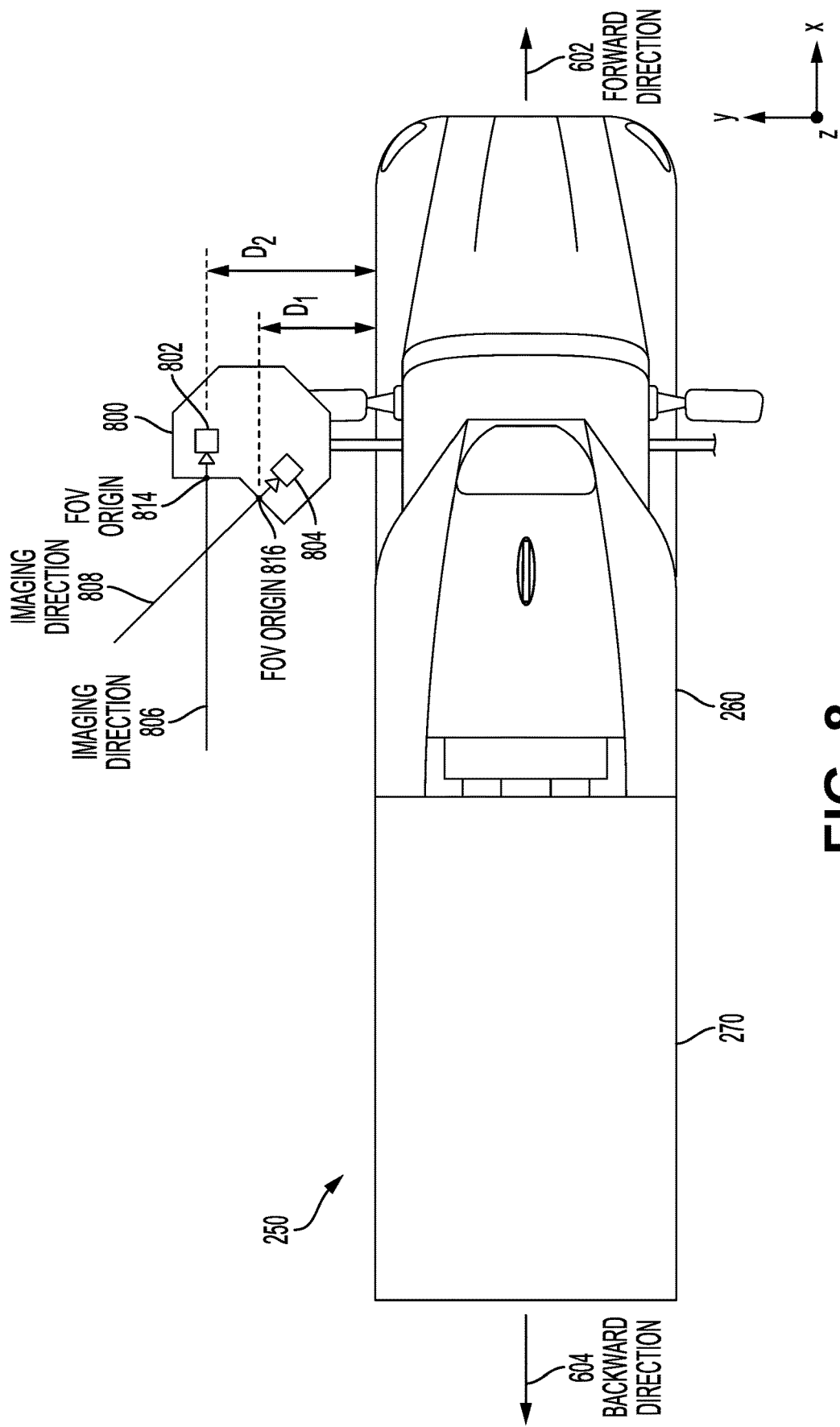
FIG. 8 is an illustration of an example improved sensor assembly configuration, according to example embodiments.

FIG. 8 illustrates an example embodiment of such a sensor assembly as a modified sensor assembly 800 mounted to the front left portion of the semi-truck 250. It is understood that, for purpose of illustration, the sensor assembly 800 is shown larger than it might be in practice. This sensor assembly 800 is shown by way of example being irregularly shaped rather than being octagonal or circular. However, the sensor assembly 800 could alternatively be octagonal, circular, or another shape; further, separate housings or housing components could be provided for separate sensors, among other possibilities. In some cases, the sensor assembly 800 being octagonal, circular, or otherwise rotationally symmetric facilitates the incorporation of cleaning mechanisms such as wipers.

As shown in FIG. 8, at least two example sensors 802, 804 within this example sensor assembly 800 each have at least partially backward-facing imaging directions due to the position and orientation of the sensors within the sensor assembly 800. Namely, sensor 802 has an imaging direction 806 that faces directly backward, parallel in yaw with a backward direction 604 of the semi-truck 250, and sensor 804 has an imaging direction 808 that is about 45 degrees in yaw from being parallel with the backward direction 604 of the semi-truck 250.

For simplicity, FIG. 8 omits illustrations of the FOVs of these two sensors. However, as shown, each of the sensors has a respective FOV origin. Namely, the figure shows that sensor 802 has a FOV origin 814 defining the point where the imaging direction 806 of sensor 802 intersects the sensor-assembly housing, and the figure shows that sensor 804 has a FOV origin 816 defining the point where the imaging direction 808 of sensor 804 intersects the sensor-assembly housing.

Optimally, of the two illustrated sensors in this example arrangement, the sensor 802 that has the most backward-facing imaging direction 806 has a FOV origin 814 that is farther from the semi-truck 250, i.e., more outboard from the semi-truck 250, than the FOV origin 816 of the other sensor 804 that has a less backward-facing imaging direction 808. In particular, as shown, the FOV origin 816 of sensor 804 is merely a distance $D_1$ from the left side of the semi-truck 250, whereas the FOV origin 814 of sensor 802 is a greater distance $D_2$ from the left side of the semi-truck 250.

Figure 9:
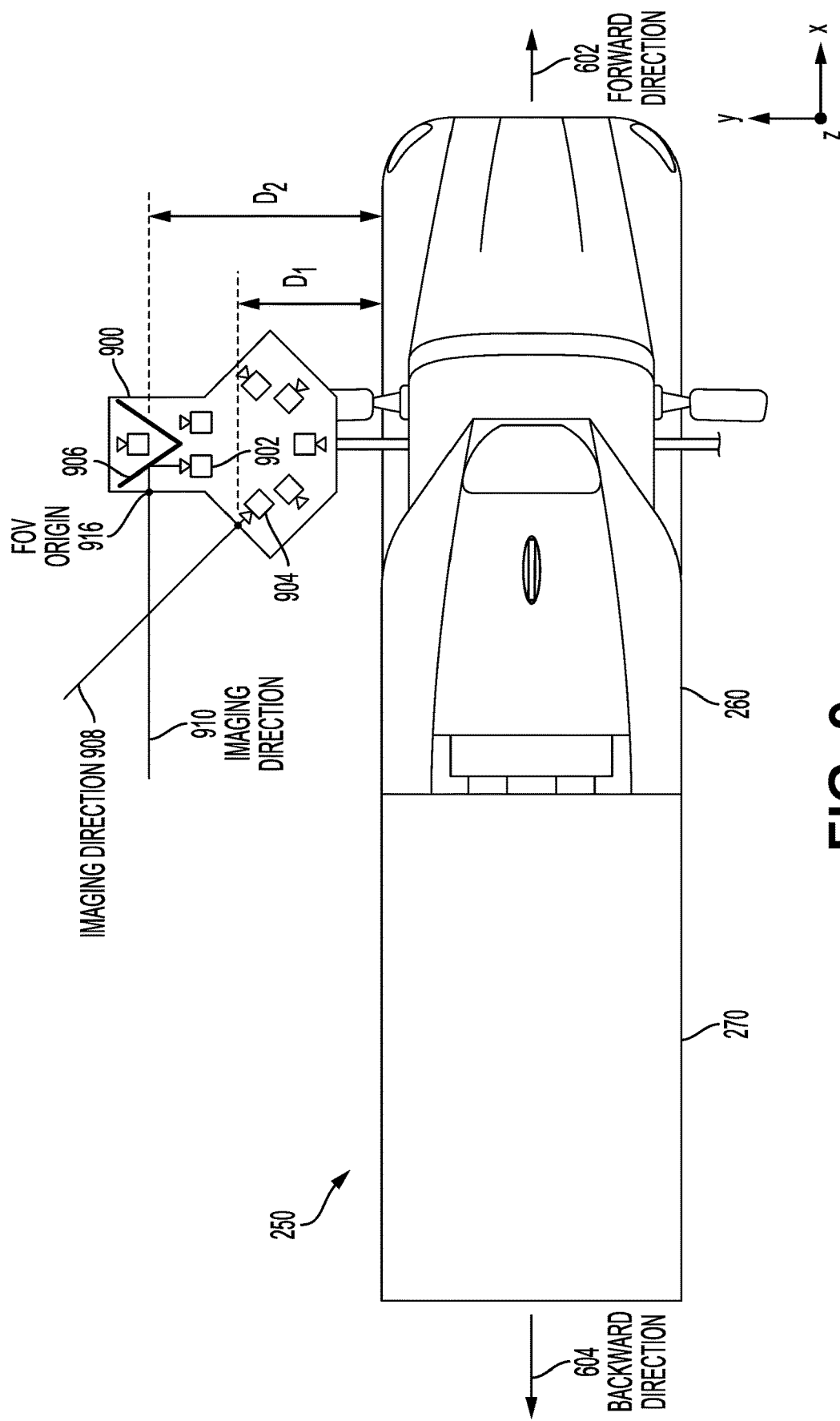
FIG. 9 is an illustration of another example improved sensor assembly configuration, according to example embodiments.

FIG. 9 shows another example embodiment of such a sensor assembly as a modified sensor assembly 900 likewise mounted to the front left portion of the semi-truck 250. It is understood that, for purpose of illustration, the sensor assembly 900 is shown larger than it might be in practice. This sensor assembly 900 is also shown by way of example being irregularly shaped rather than being octagonal or circular. However, here too, the sensor assembly 900 could alternatively be octagonal, circular, or another shape; further, separate housings or housing components could likewise be provided for separate sensors, among other possibilities.

As shown in FIG. 9, at least two example sensors 902, 904 within this example sensor assembly 900 likewise each have at least partially backward-facing imaging directions, with the imaging direction of sensor 902 being redirected by a mirror, prism, waveguide (e.g., optical fiber), lens, aperture, and/or one or more other redirection mechanisms 906 (e.g., optical or other components). As a result, sensor 902 has an imaging direction 908 that faces directly backward, parallel in yaw with a backward direction 604 of the semi-truck 250, and sensor 904 has an imaging direction 910 that is about 45 degrees in yaw from being parallel with the backward direction 604 of the semi-truck 250.

For simplicity, FIG. 9 similarly omits illustrations of the FOVs of these two sensors 902, 904. However, the figure shows that each sensor has a respective FOV origin. Namely, the figure shows that sensor 902 has a FOV origin 916 defining the point where the redirected imaging direction 908 of sensor 902 intersects the sensor-assembly housing, and the figure shows that sensor 904 has a FOV origin 918 defining the point where the imaging direction 910 of sensor 904 intersects the sensor-assembly housing. Note also that, with use of a redirection mechanism such as that shown in FIG. 9, it could alternatively be possible for sensor 902 (with the most backward-facing imaging direction) to be positioned closer to the vehicle (i.e., in a less outboard position) than sensor 904 (with a less backward-facing imaging direction) and to still have a more outboard FOV origin than sensor 904.

By so configuring the sensor assembly such that, of its multiple sensors having at least partly backward-facing imaging directions, the sensor having the most backward-facing imaging direction (which may or may not be directly backward-facing) has a FOV origin that is most outboard from the vehicle, the sensor assembly could provide an improved view behind the vehicle and an improved view along the side of the vehicle, as discussed above with respect to FIG. 7. As a result, the examples shown in FIGS. 8 and 9 or other such configurations may provide for improved detection of objects behind the vehicle and may also provide for improved monitoring of the state of the side of the vehicle, such monitoring of yaw and roll of a semi-truck's trailer for instance.

Accordingly, as noted above, a sensor assembly could comprise an assembly housing defining an enclosure containing a plurality of sensors and defining an exterior surface through which the sensors are configured to perform imaging from a front or other portion of a vehicle, where the vehicle has a forward direction and a backward direction, where each sensor has a respective FOV based on a respective imaging direction of the sensor, where each sensor's imaging direction intersects the exterior surface of the assembly housing at a respective point defining a respective FOV origin of the sensor, and where the plurality of sensors comprises a first sensor and a second sensor.

Further, as noted above, such a sensor assembly could be configured to be disposed at the front or other portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction to being parallel to the backward direction of the vehicle, and (iv) the first sensor's FOV origin is more outboard from the vehicle than the second sensor's FOV origin. For instance, the sensor assembly could be fabricated of a suitable size, material, and structure to facilitate securely mounting the sensor assembly to the front portion of the vehicle as noted above, and the sensor assembly could be equipped with the sensors, and possibly one or more imaging-redirection mechanisms positioned and structured to provide the noted imaging directions and FOV origins.

In line with the discussion above, the plurality of sensors could comprise a camera. Without limitation, for instance, all of the sensors within the sensor assembly could be cameras. Further or alternatively, the plurality of sensors could comprise a lidar device, a radar device, a microphone device, a sonar device and/or one or more other sensors.

As also discussed above, the example sensor assembly could be disposed at the front portion of the vehicle by the sensor assembly being mounted to the vehicle proximate to a front corner or front side of the vehicle. For instance, if the vehicle comprises a tractor and a trailer, the sensor assembly could be disposed at the front portion of the vehicle by being mounted to the tractor, with at least the first sensor possibly providing for imaging of at least the trailer. By way of example, the sensor assembly could be mounted to the tractor by being mounted to a bar attached to the tractor. Further, as discussed above, the first sensor's FOV could encompass at least a portion of a side of the vehicle and an area behind the vehicle.

As additionally discussed above, the assembly housing of the sensor assembly could contain at least one imaging-redirection device, and the first sensor could be configured to perform imaging via the at least one imaging-redirection device. For instance, the sensor assembly could contain at least one mirror or prism, and the first sensor could be oriented within the sensor assembly in such a manner that it performs imaging along a path redirected by the at least one mirror or prism, so as to establish the first sensor's imaging direction and FOV origin.

In addition, as discussed above, the FOVs of the sensors of the plurality of sensors in the sensor assembly could at least partially overlap with each other. Further, as discussed above, the plurality of sensors could provide image data to facilitate the vehicle operating in an autonomous mode or a semi-autonomous mode.

Still further, in line with the discussion above, the plurality of sensors in the sensor assembly could additionally comprise a third sensor and a fourth sensor, and, when the sensor assembly is disposed at the front or other portion of the vehicle, (i) the third and fourth sensors' FOV origins could each outboard from the vehicle, and (ii) the third and fourth second sensors' imaging directions could each be within 90 degrees of yaw of being parallel to the forward direction of the vehicle.

As further discussed above, an imaging system could comprise a sensor assembly and an imaging processing system. The sensor assembly could be configured as discussed above, by way of example and could be mounted at a front or other portion of a vehicle. Further, the image processing system could be configured to receive and process data generated by the plurality of sensors of the sensor assembly. As noted above, this image processing could thus help facilitate control of the vehicle, such as navigation of the vehicle based on detected objects in the surrounding environment, and may also help facilitate monitoring a state of the vehicle itself, among other possibilities.

Various features described above can be implemented in this context as well, and vice versa.

FIG. 10 is a flow chart depicting an example method that could be carried out in view of the discussion above. In some embodiments, the method may be performed by a sensor assembly (e.g., a sensor assembly 800 as shown and described with reference to FIG. 8 or a sensor assembly as shown and described with reference to FIG. 9). As shown in FIG. 10, at block 1000, the example method includes capturing data using a sensor assembly, where the sensor assembly comprises an assembly housing defining an enclosure containing a plurality of sensors and defining an exterior surface through which the sensors are configured to perform imaging from a front or other portion of a vehicle, where the vehicle has a forward direction and a backward direction, where each sensor has a respective FOV based on a respective imaging direction of the sensor, where each sensor's imaging direction intersects the exterior surface of the assembly housing at a respective point defining a respective FOV origin of the sensor, where the plurality of sensors comprises a first sensor and a second sensor, and where the sensor assembly is disposed at the front or other portion of the vehicle such that (i) the first and second sensors' FOV origins are each outboard from the vehicle, (ii) the first and second sensors' imaging directions are each within 90 degrees in yaw of being parallel to the backward direction of the vehicle, (iii) the first sensor's imaging direction is closer in yaw than the second sensor's imaging direction to being parallel to the backward direction of the vehicle, and (iv) the first sensor's FOV origin is more outboard from the vehicle than the second sensor's FOV origin.

Further, at block 1002, the example method includes transmitting the captured data to an image processing system that is configured to process the captured data. For instance, as the sensors perform sensing and thereby generate and capture data representing one or more objects in the surrounding environment such as one or more objects on or proximate to a roadway and/or one or more objects on or associated with the vehicle, that captured data could be transmitted to an image processing system within the vehicle and/or to a remote image processing system for processing of the data.

Various features described above can be implemented in this context as well, and vice versa.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A sensor assembly comprising:
    an assembly housing defining an exterior surface; and
    a plurality of sensors contained within the assembly housing, the plurality of sensors including at least a first sensor and a second sensor, wherein each sensor of the plurality of sensors has a respective imaging direction that extends from within the assembly housing, through the exterior surface, to outside the assembly housing,
    wherein the sensor assembly containing the plurality of sensors is configured to be disposed at a portion of a vehicle such that (i) the imaging direction of the first sensor intersects the exterior surface of the assembly housing at a first point that is outboard from the vehicle and the imaging direction of the second sensor intersects the exterior surface of the assembly housing at a second point that is more outboard from the vehicle than the first point, and (ii) the second sensor's imaging direction is closer in yaw than the first sensor's imaging direction to being parallel to a backward direction of the vehicle.

2. The sensor assembly of claim 1, wherein the plurality of sensors comprises a camera.

3. The sensor assembly of claim 1, wherein the plurality of sensors comprises a lidar device, a radar device, a microphone device, or a sonar device.

4. The sensor assembly of claim 1, wherein the sensor assembly being disposed at the portion of the vehicle comprises the sensor assembly being mounted to the vehicle proximate to a front corner or front side of the vehicle.

5. The sensor assembly of claim 1, wherein the vehicle comprises a tractor and a trailer, and wherein the sensor assembly being disposed at the portion of the vehicle comprises the sensor assembly being mounted to the tractor.

6. The sensor assembly of claim 5, wherein the sensor assembly being mounted to the tractor comprises the sensor assembly being mounted to a bar attached to a front of the tractor.

7. The sensor assembly of claim 1, wherein each sensor of the plurality of sensors has a respective field of view (FOV) based on the respective imaging direction of the sensor, and wherein, when the sensor assembly is disposed at the portion of the vehicle, the first sensor's FOV encompasses at least a portion of a side of the vehicle and an area behind the vehicle.

8. The sensor assembly of claim 1, wherein the assembly housing contains at least one imaging-redirection device, and wherein the first sensor is configured to perform imaging via the at least one imaging-redirection device.

9. The sensor assembly of claim 1, wherein each sensor of the plurality of sensors has a respective field of view (FOV) based on the respective imaging direction of the sensor, and wherein, when the sensor assembly is disposed at the portion of the vehicle, the FOVs of the sensors of the plurality of sensors partially overlap with each other.

10. The sensor assembly of claim 1, wherein the plurality of sensors provides image data to facilitate the vehicle operating in an autonomous mode or a semi-autonomous mode.

11. The sensor assembly of claim 1, wherein the sensor assembly is disposed at the portion of the vehicle.

12. The sensor assembly of claim 1, wherein the plurality of sensors further comprises a third sensor and a fourth sensor, and wherein, when the sensor assembly is disposed at the portion of the vehicle, the imaging directions of the third and fourth sensors (i) each intersect the exterior surface of the assembly housing at a respective point that is outboard from the vehicle, and (ii) are each within 90 degrees of yaw of being parallel to the forward direction of the vehicle.

13. An imaging system comprising:
    a sensor assembly; and
    an image processing system,
    wherein the sensor assembly comprises an assembly housing defining an exterior surface and containing a plurality of sensors, the plurality of sensors including at least a first sensor and a second sensor, wherein each sensor of the plurality of sensors has a respective imaging direction that extends from within the assembly housing, through the exterior surface, to outside the assembly housing, and
    wherein the sensor assembly containing the plurality of sensors is disposed at a portion of a vehicle such that (i) the imaging direction of the first sensor intersects the exterior surface of the assembly housing at a first point that is outboard from the vehicle and the imaging direction of the second sensor intersects the exterior surface of the assembly housing at a second point that is more outboard from the vehicle than the first point, and (ii) the second sensor's imaging direction is closer in yaw than the first sensor's imaging direction to being parallel to a backward direction of the vehicle, and wherein the image processing system is configured to receive and process data generated by the plurality of sensors.

14. The imaging system of claim 13, wherein the plurality of sensors comprises a camera.

15. The imaging system of claim 13, wherein the vehicle comprises a tractor and a trailer, and wherein the sensor assembly is mounted to the tractor and at least the first sensor provides for imaging of at least the trailer.

16. The imaging system of claim 13, wherein each sensor of the plurality of sensors has a respective field of view (FOV) based on the respective imaging direction of the sensor, and wherein the first sensor's FOV encompasses at least a portion of a side of the vehicle and an area behind the vehicle.

17. The imaging system of claim 13, wherein the assembly housing contains at least one imaging-redirection device comprising a mirror or a prism, and wherein the first sensor is configured to perform imaging via the at least one imaging-redirection device.

18. The imaging system of claim 13, wherein each sensor of the plurality of sensors has a respective field of view (FOV) based on the respective imaging direction of the sensor, and wherein the FOVs of the sensors of the plurality of sensors partially overlap with each other.

19. The imaging system of claim 13, wherein the plurality of sensors further comprises a third sensor and a fourth sensor, and wherein, with the sensor assembly disposed at the portion of the vehicle, the imaging directions of the third and fourth sensors (i) each intersect the exterior surface of the assembly housing at a respective point that is outboard from the vehicle, and (ii) are each within 90 degrees of yaw of being parallel to the forward direction of the vehicle.

20. A method comprising:

capturing data using a sensor assembly, wherein the sensor assembly comprises an assembly housing defining an exterior surface and containing a plurality of sensors, the plurality of sensors including at least a first sensor and a second sensor, wherein each sensor of the plurality of sensors has a respective imaging direction that extends from within the assembly housing, through the exterior surface, to outside the assembly housing, and wherein the sensor assembly containing the plurality of sensors is disposed at a portion of a vehicle such that (i) the imaging direction of the first sensor intersects the exterior surface of the assembly housing at a first point that is outboard from the vehicle and the imaging direction of the second sensor intersects the exterior surface of the assembly housing at a second point that is more outboard from the vehicle than the first point, and (ii) the second sensor's imaging direction is closer in yaw than the first sensor's imaging direction to being parallel to a backward direction of the vehicle; and transmitting the captured data to an image processing system, wherein the image processing system is configured to process the captured data.

* * * * *